US010815152B2

(12) United States Patent
Dengler et al.

(10) Patent No.: US 10,815,152 B2
(45) Date of Patent: Oct. 27, 2020

(54) HYDRATION CONTROL MIXTURE FOR MORTAR AND CEMENT COMPOSITIONS

(71) Applicant: BASF SE, Ludwigshafen am Rhein (DE)

(72) Inventors: Joachim Dengler, Trostberg (DE); Christoph Hesse, Trostberg (DE); Sebastian Seufert, Trostberg (DE)

(73) Assignee: BASF SE, Ludwigshafen am Rhein (DE)

( * ) Notice: Subject to any disclaimer, the term of this patent is extended or adjusted under 35 U.S.C. 154(b) by 91 days.

(21) Appl. No.: 16/308,119

(22) PCT Filed: Jun. 9, 2017

(86) PCT No.: PCT/EP2017/064170
§ 371 (c)(1),
(2) Date: Dec. 7, 2018

(87) PCT Pub. No.: WO2017/212044
PCT Pub. Date: Dec. 14, 2017

(65) Prior Publication Data
US 2019/0119163 A1    Apr. 25, 2019

(30) Foreign Application Priority Data

Jun. 9, 2016  (EP) .................................... 16173714

(51) Int. Cl.
| | |
|---|---|
| C04B 28/06 | (2006.01) |
| C04B 28/04 | (2006.01) |
| C04B 28/16 | (2006.01) |
| C04B 28/14 | (2006.01) |
| C04B 22/10 | (2006.01) |
| C04B 22/14 | (2006.01) |
| C04B 24/04 | (2006.01) |
| C04B 103/22 | (2006.01) |
| C04B 111/00 | (2006.01) |
| C04B 111/27 | (2006.01) |
| C04B 111/62 | (2006.01) |
| C04B 111/70 | (2006.01) |
| C04B 111/72 | (2006.01) |
| C04B 111/60 | (2006.01) |
| C04B 111/28 | (2006.01) |
| C04B 24/16 | (2006.01) |
| C04B 103/14 | (2006.01) |
| C04B 103/40 | (2006.01) |

(52) U.S. Cl.
CPC .............. *C04B 28/06* (2013.01); *C04B 22/10* (2013.01); *C04B 22/143* (2013.01); *C04B 24/045* (2013.01); *C04B 28/04* (2013.01); *C04B 28/065* (2013.01); *C04B 28/145* (2013.01); *C04B 28/16* (2013.01); *C04B 24/166* (2013.01); *C04B 2103/14* (2013.01); *C04B 2103/22* (2013.01); *C04B 2103/408* (2013.01); *C04B 2111/00155* (2013.01); *C04B 2111/00482* (2013.01); *C04B 2111/00637* (2013.01); *C04B 2111/00663* (2013.01); *C04B 2111/00801* (2013.01); *C04B 2111/27* (2013.01); *C04B 2111/28* (2013.01); *C04B 2111/60* (2013.01); *C04B 2111/62* (2013.01); *C04B 2111/70* (2013.01); *C04B 2111/72* (2013.01)

(58) Field of Classification Search
CPC ..... C04B 22/10; C04B 22/143; C04B 24/045; C04B 24/166; C04B 28/04; C04B 28/06; C04B 28/16; C04B 28/065; C04B 28/145; C04B 2103/14; C04B 2103/22; C04B 2103/408; C04B 2111/00637; C04B 2111/00663; C04B 2111/27; C04B 2111/28; C04B 2111/60; C04B 2111/62; C04B 2111/70; C04B 2111/72; C04B 2111/00155; C04B 2111/00801; C04B 2111/00482
See application file for complete search history.

(56) References Cited

U.S. PATENT DOCUMENTS

| | | |
|---|---|---|
| 4,430,469 A | 2/1984 | Bürge et al. |
| 4,661,159 A | 4/1987 | Ortega et al. |
| 5,669,968 A | 9/1997 | Kobori et al. |
| 5,685,903 A | 11/1997 | Stav et al. |
| 6,506,246 B1 | 1/2003 | Cheriton et al. |
| 6,555,683 B1 | 4/2003 | Weichmann et al. |
| 6,740,155 B1 | 5/2004 | Boggs et al. |
| 6,827,776 B1 | 12/2004 | Boggs et al. |

(Continued)

FOREIGN PATENT DOCUMENTS

| | | |
|---|---|---|
| CA | 2 172 004 A1 | 9/1996 |
| CH | 686 186 A5 | 1/1996 |

(Continued)

OTHER PUBLICATIONS

Derwent-Acc-No. 2019-259548, abstract of Belarus Patent Specification No. BY 19422 C1 (Year: 2015).*

(Continued)

*Primary Examiner* — Anthony J Green
(74) *Attorney, Agent, or Firm* — Oblon, McClelland, Maier & Neustadt, L.L.P.

(57) ABSTRACT

The present invention relates to a mixture comprising at least one compound comprising an α-hydroxy-carboxylic unit, α-hydroxy-sulfonic acid unit or α-carbonyl-carboxylic unit and at least one water-soluble organic carbonate. The mixture is useful as a hydration control agent in construction chemical compositions comprising an inorganic binder.

23 Claims, No Drawings

(56) References Cited

U.S. PATENT DOCUMENTS

| | | | |
|---|---|---|---|
| 7,338,990 B2 | 3/2008 | Lettkeman et al. | |
| 9,353,003 B2 * | 5/2016 | Hohn | C04B 28/02 |
| 2003/0060383 A1 * | 3/2003 | Machac, Jr. | C11D 7/266 |
| | | | 510/201 |
| 2003/0152524 A1 * | 8/2003 | Eshita | A61K 8/29 |
| | | | 424/49 |
| 2004/0157984 A1 * | 8/2004 | Sakai | A61K 8/42 |
| | | | 524/588 |
| 2017/0253788 A1 * | 9/2017 | Ivanov | C09K 8/62 |

FOREIGN PATENT DOCUMENTS

| | | | |
|---|---|---|---|
| CN | 105154254 A * | 12/2015 | |
| DE | 23 59 291 C2 | 6/1975 | |
| DE | 44 11 797 A1 | 10/1995 | |
| EP | 0 650 940 A1 | 5/1995 | |
| EP | 0 753 488 A2 | 1/1997 | |
| EP | 0 894 811 A1 | 2/1999 | |
| EP | 1 851 256 B1 | 8/2010 | |
| EP | 2 463 314 A1 | 6/2012 | |
| EP | 2876094 A1 * | 5/2015 | C04B 2103/50 |
| JP | 11-116956 A | 4/1999 | |
| JP | 2007003617 A * | 1/2007 | |
| WO | WO 00/14026 A2 | 3/2000 | |
| WO | WO 00/23395 A1 | 4/2000 | |
| WO | WO-2007095101 A2 * | 8/2007 | C11D 3/245 |
| WO | WO 2008/012438 A2 | 1/2008 | |
| WO | WO 2009/103579 A1 | 8/2009 | |
| WO | WO 2010/026155 A1 | 3/2010 | |
| WO | WO 2014/114782 A1 | 7/2014 | |
| WO | WO 2014/114784 A1 | 7/2014 | |

OTHER PUBLICATIONS

Extended European Search Report dated Dec. 13, 2016 in Patent Application No. 16173714.3, citing documents AA-AC and AJ-AL therein, 3 pages.

International Search Report dated Sep. 5, 2017 in PCT/EP2017/064170 filed Jun. 9, 2017, citing documents AA-AC and AJ-AL therein, 4 pages.

* cited by examiner

HYDRATION CONTROL MIXTURE FOR MORTAR AND CEMENT COMPOSITIONS

The present invention concerns a hydration control mixture for mortar and cement compositions, the cement compositions containing the hydration control mixture and the use of the hydration control mixture.

Ternary binder systems containing ordinary Portland cement (OPC), calcium aluminate cement and calcium sulfate based binders are frequently used, for example in self-leveling underlayments (SLU), and are described in "Lamberet S., 2004, Durability of ternary binder systems based on Portland cement, calcium aluminate cement and calcium sulfate, Thése École polytechnique fédérale de Lausanne EPFL, no 3151 (2005)" and "Zurbriggen, R.; Bühler, E.; Lang, J. (2006). Mixed-binder based self-leveling flooring compounds: Critical formulations—the reason for typical damages. 16. Ibausil Weimar".

Binary binder systems, which contain ordinary Portland cement (OPC) and calcium sulfate based binders are for example described in the U.S. Pat. No. 5,685,903 in applications for floor underlayments, floor and road patching materials and fiberboards. The construction materials contain from about 20 weight % to about 75 weight % calcium sulfate beta-hemihydrate, about 10 weight % to about 50 weight % of a cement, silica fume, pozzolanic aggregate and as a setting retarder a natural protein-based material.

U.S. Pat. No. 4,661,159 discloses cementitious floor underlayments including beta gypsum (45 to 55 weight %), alpha gypsum (20 to 30 weight %), Portland cement (about 20 weight %) and fly ash (about 5 weight %), in each case the weight percentages are given as values referring to the total dry weight of the composition. As setting retarder sodium citrate is disclosed. The compositions are said to be quick-setting, non-combustible, non-water-permeable and easy to work.

U.S. Pat. No. 7,338,990 B2 discloses a mixture for preparing a slurry that hydrates to form an exterior gypsum cement, comprising 30 to 70 weight % hydraulic cement, 30 to 70 weight % calcined gypsum and 0.05 to 2.5 weight % polycarboxylate dispersant, wherein the dispersant is based on oxyalkyleneglycol-alkyl ethers and unsaturated dicarboxylic acid derivatives. The mixtures allow improved production of molded articles due to the decreased expansion of the casted material and at the same time improved mechanical strength.

U.S. Pat. No. 6,827,776 discloses a method of accelerating the setting time of a hydraulic cement mixture with an accelerator slurry having an alkaline pH. The slurry comprises a pH balancing agent such as an alkali or alkaline earth metal hydroxide or a salt of an hydroxycarboxylic acid such as citric acid, malic acid, glycolic acid or glyoxylic acid.

WO 00/23395 discloses a process for preparing a permeable aerated mortar by mixing a mortar material containing a rapidly hardening cement with a foam. The material may contain a conventional set retarder such as citric acid, gluconic acid, tartaric acid, malic acid, and salts thereof, sodium carbonate, potassium carbonate or sodium bicarbonate.

WO 00/14026 A2 discloses a substantially water-free hardener composition suitable for admixture with a cement to give a product capable of reaction with a silicate to form a hardened mass. The composition comprises an organic carbonate hardener for the silicate and citric acid as organic cement retarder. The addition of citric acid produced a stable dry composition.

EP 650 940 A1 discloses an inorganic hardening composition comprising an alkaline earth metal oxide and an organic carbonic acid. Citric acid may be added as a setting retarder.

JP H11116956 A describes a method for hardening water glass by adding an aluminum or iron salt of an oxycarboxylic acid.

Dry mortars of the prior art often have the disadvantage that they are not satisfying in relation to flowability and development of compressive strength, shrinkage and final strength. To overcome these disadvantages aluminate-containing components are added. Due to the rapidly occurring aluminate reaction the open time of the cement slurries is significantly reduced and unacceptable for suitable processability. Consequently, retarders for the aluminate reaction have to be added. The retarders, however, suppress the silicate reaction which can therefore not contribute to strength development. Silicate reaction means the hydration of anhydrous silicates such as tricalcium silicate ($C_3S$) and dicalcium silicate ($C_2S$) under formation of portlandite and/or calcium-silicate-hydrate.

The problem underlying the invention was to provide a construction chemical composition (building material formulation) which solves the problems of the prior art. In particular the compositions should show a sufficient open time (time until initial setting), a good processability (workability) during said open time (characterized for example by constant flow over time) and fast setting. Furthermore, the composition should provide an improved compressive strength after 24 h as compared to the use of conventional retarders. In particular, the construction chemical composition should have a well-balanced property profile.

This problem is solved by providing a mixture comprising a) at least one aliphatic compound comprising an α-hydroxy-carboxylic unit, α-hydroxy-sulfonic acid unit or α-carbonyl-carboxylic unit and b) at least one water-soluble organic carbonate.

In an embodiment, component (a) does not include citric acid.

The mixture is useful as a hydration control additive in a construction chemical composition (also called building material formulation).

Component a)

The term "α-hydroxy-carboxylic unit" means here a group of the formula YOOC—CH(OH)—.

The term "α-hydroxy-sulfonic unit" means here a group of the formula $XO_3S$—CH(OH)—.

The term "α-carbonyl-carboxylic unit" means here a group of the formula YOOC—C(=O)—.

In said formulae X and Y have the given below.

In an embodiment, the α-hydroxy-carboxylic unit, α-hydroxy-sulfonic acid unit or α-carbonyl-carboxylic unit is an aliphatic unit.

In one embodiment, component a) is a compound of the general formula I

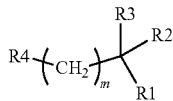
(I)

wherein
R1 is OH;
R2 is H, OH, $C_1$-$C_6$ alkoxy, —$SO_2X$, —$SO_3X$, —$OSO_3X$, —$PO_3X_2$, —$OPO_3X_2$, —COOX, —Z—COOX or —CH(OH)—$SO_3X$;
R3 is H, COOX, $C_1$-$C_6$ alkyl which may be substituted by 1 or 2 OH or $C_1$-$C_6$ alkoxy;
m is 0 or 1; or
R1 and R2 taken together with the carbon atom to which they are attached form a carbonyl group provided m is 0;
R4 is —COOY or —$SO_3X$;
X is selected from H or a cation equivalent $K_a$ wherein K is selected from an alkali metal, alkaline earth metal, zinc, iron, ammonium or phosphonium cation and a is 1/n wherein n is the valency of the cation;
Y= is selected from X, $C_1$-$C_6$ alkyl or phenyl, preferably X or $C_1$-$C_6$ alkyl; and
Z is $CH_2$ or CH(OH).

In an embodiment, R2 is OH.

In another embodiment, R3 is H, —COOX or $C_1$-$C_6$ alkyl, in particular H or $C_1$-$C_6$ alkyl, and preferably H.

In a further embodiment, R1 and R2 taken together with the carbon atom to which they are attached form a carbonyl group.

In a further embodiment, R3 is H or —COOX, preferably H, and R2 is OH, —$SO_3X$, —Z—COOX, —CH(OH)—$SO_3X$ or —COOX.

In a further embodiment, R3 is H and R2 is —$SO_3X$ or —Z—COOX.

In a further embodiment, R3 is H and R2 is —COOX.

In a further embodiment, R4 is —COOY.

In a further embodiment, Y is X.

In a further embodiment, m is 0 or 1 with the proviso that, if m is 1, R2 is —Z—COOX.

In another embodiment, component a) is a compound of the general formula I, wherein
R1 is OH;
R2 is OH, —$SO_3X$, —Z—COOX, —CH(OH)—$SO_3X$ or —COOX;
or R1 and R2 taken together with the carbon atom to which they are attached form a carbonyl group;
R3 is H, or —COOX, preferably H;
R4 is —COOY or —$SO_3X$;
m is 0 or 1 with the proviso that, if m is 1, R2 is —Z—COOX and;
X is selected from H or a cation equivalent $K_a$ wherein K is selected from an alkali metal, alkaline earth metal, zinc, iron, ammonium or phosphonium cation and a is 1/n wherein n is the valency of the cation;
Y is X.

In another embodiment, component a) is a compound of the general formula I, wherein
R1 is OH;
R2 is OH, —$SO_3X$, —Z—COOX or —COOX;
R3 is H, —COOX or $C_1$-$C_6$ alkyl, preferably H; or
R1 and R2 taken together with the carbon atom to which they are attached form a carbonyl group;
R4 is —COOY;
m is 0 or 1 with the proviso that, if m is 1, R2 is —Z—COOX;
X is selected from H or a cation equivalent $K_a$ wherein K is selected from an alkali metal, alkaline earth metal, zinc, iron, ammonium or phosphonium cation and a is 1/n wherein n is the valency of the cation;
Y is selected from X.

In a further embodiment, m, R2 and R4 are selected as follows:
a) m is 0, R2 is —$SO_3X$ and R4 is —COOX;
b) m is 0, R2 is —COOX and R4 is —COOX;
c) m is 0, R2 is —Z—COOX and Z is $CH_2$ and R4 is —COOX;
d) m is 0, R2 is —Z—COOX and Z is —CH(OH) and R4 is —COOX;
e) m is 0; R1 and R2 taken together with the carbon atom to which they are attached form a carbonyl group and R4 is —COOX;
f) m is 0; R1 and R2 taken together with the carbon atom to which they are attached form a carbonyl group and R4 is —$SO_3X$; or
g) m is 0; R2 is —CH(OH)—$SO_3X$, and R4 is —$SO_3X$.
In embodiments a) to g), R3 is preferably H.

If X is a cation equivalent, the resulting compound is a salt which also includes mixed salts. In another embodiment, X is an alkali metal, in particular lithium, sodium or potassium.

Preferred compounds that are useful as component a) are those of the formulae Ia and Ib

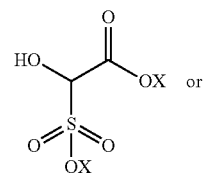
(Ia)

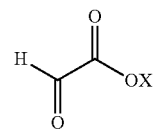
(Ib)

wherein X is as defined above and in particular sodium or potassium, or a mixture thereof.

Further preferred compounds of formula (I) are malic acid, tartaric acid, and tartronic acid, in particular tartaric acid, and their alkali metal or alkaline earth metal salts or a mixture thereof. Another preferred compound is the glyoxal-mono- or glyoxal-bis(bisulfite) adduct and their alkali metal or alkaline earth metal salts or a mixture thereof.

The compounds of component a) are commercially available or can be prepared by conventional methods which are known to the skilled person.

Component b)

Component b) is water-soluble organic carbonate. Water-soluble here means that the carbonate has a solubility in water of 50 g/L at 20° C. In an embodiment, the water-soluble carbonate is selected from ethylene carbonate, propylene carbonate, glycerol carbonate, dimethyl carbonate, di(hydroxyethyl)carbonate or a mixture thereof, preferably ethylene carbonate, propylene carbonate, and glycerol carbonate or a mixture thereof, and in particular ethylene carbonate and/or propylene carbonate.

The compounds of component b) are commercially available or can be prepared by conventional methods which are known to the skilled person.

The weight ratio of component a) to component b) is in general in the range from about 100:1 to about 1:100, in particular about 10:1 to about 1:10 or about 5:1 to about 1:5 or about 3:1 to about 1:3.

In a preferred embodiment, the mixture comprises
a) a compound of formula Ia, Ib or tartaric acid, wherein X is as defined above and in particular sodium or potassium, or a mixture thereof, and
b) ethylene carbonate or propylene carbonate or a mixture thereof.

In an embodiment, the mixture of the invention additionally contains at least one additive. Such additives are, for example, inorganic carbonates, such as alkali metal or alkaline earth metal carbonates, alkali metal sulfates, latent hydraulic binders, dispersants, in particular polymeric dispersants and fillers. The additives are described in greater detail below in relation to the construction chemical compositions. The description is likewise applicable to the mixtures of the invention. The weight ratio of mixture to additive is in the range from 10000:1 to 1:10000, preferably 1:5000 to 5000:1.

Preferably, the additives are selected from fillers which can act as carrier for the components a) and b). For example limestone powder (containing $CaCO_3$, $MgCO_3$, $CaMg(CO_3)_2$), layered silicates like kaolin or bentonite or metakaolin, latent hydraulic binders such as micro silica, fly ash, ground or granulated blast furnace slag, calcium silicate hydrate, such as precipitated calcium silicate hydrate or hydrothermal calcium silicate hydrate, and polymeric dispersants such as a polycarboxylate ether, a phosphorylated polycondensation product or a sulfonic acid and/or sulfonate group containing dispersant and mixtures thereof.

Construction Chemical Compositions

The present invention also relates to construction chemical compositions or building material formulations which comprise at least one inorganic binder and the mixture of the invention.

In an embodiment, the inorganic binder is selected from calcium sulfate hemihydrate, anhydrite and/or aluminate-containing cement.

Aluminate-containing cement here means that the cement contains aluminate phases such as tricalcium aluminate ($C_3A$), monocalcium aluminate (CA), tetra aluminate ferrate ($C_4AF$), dodecacalcium heptaaluminate ($C_{12}A_7$), yeelimite ($C_4A_3s$) etc. The amount of alumina (in form of $Al_2O_3$) is ≥1% by weight of the total mass of the aluminate-containing cement as determined by means of X-ray fluorescence (XRF).

In another embodiment, the aluminate-containing cement is selected from CEM cement and aluminate cement, in particular high alumina cement and sulfoaluminate cement, and mixtures thereof. CEM cement is a cement in accordance with the CEM classification as set forth for example in DIN EN 197-1. A preferred cement is ordinary Portland cement (OPC) according to DIN EN 197-1 which may either contain calcium sulfate (<7% by weight) or is essentially free of calcium sulfate (<1% by weight). Another preferred cement is sulfoaluminate cement (calcium sulfoaluminate cement, CSA) or high alumina cement (HAC) according to DIN EN 14647 or a mixture of ordinary Portland cement and aluminate cement, in particular a mixture of ordinary Portland cement and high alumina cement or a mixture of ordinary Portland cement and sulfoaluminate cement or a mixture of ordinary Portland cement, high alumina cement and sulfoaluminate cement.

It has been surprisingly found that the mixture of components a) and b) is useful as a retarder for the hydration of anhydrous inorganic binders resulting in the formation of hydrate phases connected with the hardening of the inorganic binders. In the case of calcium sulfate hemihydrate and anhydrite the formation of gypsum is influenced by the mixture of components a) and b). In the case of aluminate-containing cements the hydration control mixture is influencing the aluminate reaction. Aluminate reaction means the hydration of aluminate-containing clinker phases like for example tricalcium aluminate ($C_3A$), monocalcium aluminate (CA), tetra aluminate ferrate ($C_4AF$), dodecacalcium heptaaluminate ($C_{12}A_7$), yeelimite ($C_4A_3$) under formation of calcium aluminate hydrates. The hydration reactions are described in Lea's Chemistry of Cement and Concrete ($4^{th}$ edition), 2007 on pages 241-274 (hydration of Portland cement) and 722-735 (hydration of calcium aluminate cement). The hydration reaction of aluminate-containing clinker phases is retarded which is required to avoid a too rapid setting of mortar and concrete pastes and to ensure a sufficient open time which allows processing the pastes as desired.

In an embodiment, where the construction chemical compositions contain an aluminate-containing cement, the compositions may additionally contain at least one calcium sulfate which is selected from the group consisting of calcium sulfate dihydrate, anhydrite, α- and β-hemihydrate, i.e. α-bassanite and β-bassanite, or mixtures thereof. Preferably the calcium sulfate is α-bassanite and/or β-bassanite. In general, calcium sulfate is comprised in an amount of about 1 to about 20 wt %, based on the weight of the aluminate-containing cement.

In an embodiment, the construction chemical compositions additionally contain at least one alkali metal sulfate like potassium sulfate or sodium sulfate, in particular in case the inorganic binder is calciumsulfate hemihydrate or anhydrite.

In another embodiment, the construction chemical compositions additionally contain at least one alkali metal carbonate or alkaline earth metal carbonate, in particular sodium carbonate, potassium carbonate, magnesium carbonate, calcium carbonate and/or a mixed calcium-magnesium carbonate ($CaMg(CO_3)_2$. Especially the alkaline earth metal carbonates may be present in X-ray amorphous form. The carbonate is, in general, comprised in an amount in the range from about 0.1 to about 20 wt %, based on the weight of the inorganic binder. The construction chemical compositions or building material formulations may also contain latent hydraulic binders. For the purposes of the present invention, a "latent hydraulic binder" is preferably a binder in which the molar ratio (CaO+MgO):$SiO_2$ is from 0.8 to 2.5 and particularly from 1.0 to 2.0. In general terms, the above-mentioned latent hydraulic binders can be selected from industrial and/or synthetic slag, in particular from blast furnace slag, electrothermal phosphorous slag, steel slag and mixtures thereof, and the "pozzolanic binders" can generally be selected from amorphous silica, preferably precipitated silica, fumed silica and microsilica, ground glass, metakaolin, aluminosilicates, fly ash, preferably brown-coal fly ash and hard-coal fly ash, natural pozzolans such as tuff, trass and volcanic ash, natural and synthetic zeolites and mixtures thereof.

The slag can be either industrial slag, i.e. waste products from industrial processes, or else synthetic slag. The latter can be advantageous because industrial slag is not always available in consistent quantity and quality.

Blast furnace slag (BFS) is a waste product of the glass furnace process. Other materials are granulated blast furnace slag (GBFS) and ground granulated blast furnace slag (GGBFS), which is granulated blast furnace slag that has been finely pulverized. Ground granulated blast furnace slag varies in terms of grinding fineness and grain size distribution, which depend on origin and treatment method, and grinding fineness influences reactivity here. The Blaine value is used as parameter for grinding fineness, and typically has an order of magnitude of from 200 to 1000 m² kg⁻¹, preferably from 300 to 500 m² kg⁻¹. Finer milling gives higher reactivity.

For the purposes of the present invention, the expression "blast furnace slag" is however intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Electrothermal phosphorous slag is a waste product of electrothermal phosphorous production. It is less reactive than blast furnace slag and comprises about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$, and also fluoride and phosphate. Steel slag is a waste product of various steel production processes with greatly varying composition.

Amorphous silica is preferably an X-ray-amorphous silica, i.e. a silica for which the powder diffraction method reveals no crystallinity. The content of $SiO_2$ in the amorphous silica of the invention is advantageously at least 80% by weight, preferably at least 90% by weight.

Precipitated silica is obtained on an industrial scale by way of precipitating processes starting from water glass. Precipitated silica from some production processes is also called silica gel.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 m² g⁻¹.

Microsilica is a by-product of silicon production or ferrosilicon production, and likewise consists mostly of amorphous $SiO_2$ powder. The particles have diameters of the order of magnitude of 0.1 μm. Specific surface area is of the order of magnitude of from 15 to 30 m² g⁻¹.

Fly ash is produced inter alia during the combustion of coal in power stations. Class C fly ash (brown-coal fly ash) comprises according to WO 08/012438 about 10% by weight of CaO, whereas class F fly ash (hard-coal fly ash) comprises less than 8% by weight, preferably less than 4% by weight, and typically about 2% by weight of CaO.

Metakaolin is produced when kaolin is dehydrated. Whereas at from 100 to 200° C. kaolin releases physically bound water, at from 500 to 800° C. a dehydroxylation takes place, with collapse of the lattice structure and formation of metakaolin ($Al_2Si_2O_7$). Accordingly pure metakaolin comprises about 54% by weight of $SiO_2$ and about 46% by weight of $Al_2O_3$.

For the purposes of the present invention, aluminosilicates are the abovementioned reactive compounds based on $SiO_2$ in conjunction with $Al_2O_3$ which harden in an aqueous alkali environment. It is of course not essential here that silicon and aluminum are present in oxidic form, as is the case by way of example in $Al_2Si_2O_7$. However, for the purposes of quantitative chemical analysis of aluminosilicates it is usual to state the proportions of silicon and aluminum in oxidic form (i.e. as "$SiO_2$" and "$Al_2O_3$").

In an embodiment, the latent hydraulic binder is selected from the group consisting of blast furnace slag, microsilica, metakaolin, aluminosilicates, fly ash and mixtures thereof.

The latent hydraulic binder is, in general, comprised in an amount in the range from about 1 to about 30 wt %, based on the weight of the aluminate-containing cement.

Preferably, the compositions or formulations comprise at least one dispersant for calciumsulfate hemihydrate, anhydrite and/or the aluminate-containing cement. In an embodiment, the dispersant is a polymeric dispersant, which has anionic and/or anionogenic groups and polyether side chains, which preferably comprise polyalkylene glycol side chains. The anionic and/or anionogenic groups and the polyether side chains are preferably attached to the backbone of the polymeric dispersant.

The dispersants are in this case more preferably selected from the group of polycarboxylate ethers (PCEs), the anionic group being in the case of PCEs carboxylic groups and/or carboxylate groups, and phosphorylated polycondensates. Most preferable are the polycarboxylate ethers (PCEs).

The PCE is preferably produced by the radical copolymerization of a polyether macromonomer and an acid monomer in a way that at least 45 mol-%, preferably at least 80 mol-% of all structural units of the copolymer were formed by copolymerization of the polyether macromonomer and the acid monomer. The term acid monomer means in particular a monomer comprising anionic and/or anionogenic groups. The term polyether macromonomer means in particular a monomer comprising at least two ether groups, preferably at least two alkylene glycol groups.

The polymeric dispersant preferably comprises as anionic and/or anionogenic group at least one structural unit of the general formulae (Ia), (Ib), (Ic) and/or (Id):

(Ia)

in which

R¹ is H or an unbranched or branched $C_1$-$C_4$ alkyl group, $CH_2COOH$ or $CH_2CO$—X—R³;

X is NH—($C_nH_{2n}$) or O—($C_nH_{2n}$) with n=1, 2, 3 or 4, or is a chemical bond, where the nitrogen atom or the oxygen atom is bonded to the CO group;

$R^2$ is OM, $PO_3M_2$, or O—$PO_3M_2$; with the proviso that X is a chemical bond if $R^2$ is OM;
$R^3$ is $PO_3M_2$, or O—$PO_3M_2$;

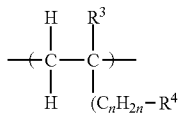 (Ib)

in which
$R^3$ is H or an unbranched or branched $C_1$-$C_4$ alkyl group;
n is 0, 1, 2, 3 or 4;
$R^4$ is $PO_3M_2$, or O—$PO_3M_2$;

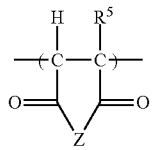 (Ic)

in which
$R^5$ is H or an unbranched or branched $C_1$-$C_4$ alkyl group;
Z is O or $NR^7$;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$, and
n is 1, 2, 3 or 4;

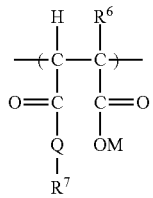 (Id)

in which
$R^6$ is H or an unbranched or branched $C_1$-$C_4$ alkyl group;
Q is $NR^7$ or O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$,
n is 1, 2, 3 or 4; and
where each M independently of any other is H or a cation equivalent.

Preferable is a composition where the polymeric dispersant comprises as polyether side chain at least one structural unit of the general formulae (IIa), (IIb), (IIc) and/or (IId):

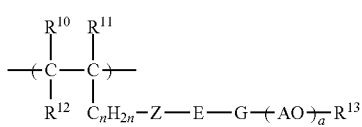 (IIa)

in which
$R^{10}$, $R^{11}$ and $R^{12}$ independently of one another are H or an unbranched or branched $C_1$-$C_4$ alkyl group;
Z is O or S;
E is an unbranched or branched $C_1$-$C_6$ alkylene group, a cyclohexylene group, $CH_2$—$C_6H_{10}$, 1,2-phenylene, 1,3-phenylene or 1,4-phenylene;
G is O, NH or CO—NH; or
E and G together are a chemical bond;
A is an unbranched or branched alkylene with 2, 3, 4 or 5 carbon atoms or $CH_2CH(C_6H_5)$;
n is 0, 1, 2, 3, 4 or 5;
a is an integer from 2 to 350;
$R^{13}$ is H, an unbranched or branched $C_1$-$C_4$ alkyl group, CO—$NH_2$ or $COCH_3$;

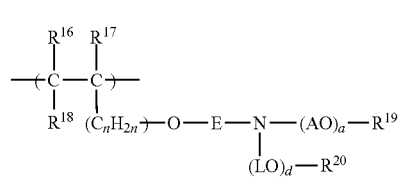 (IIb)

in which
$R^{16}$, $R^{17}$ and $R^{18}$ independently of one another are H or an unbranched or branched $C_1$-$C_4$ alkyl group;
E is an unbranched or branched $C_1$-$C_6$ alkylene group, a cyclohexylene group, $CH_2$—$C_6H_{10}$, 1,2-phenylene, 1,3-phenylene, or 1,4-phenylene, or is a chemical bond;
A is an unbranched or branched alkylene with 2, 3, 4 or 5 carbon atoms or $CH_2CH(C_6H_5)$;
n is 0, 1, 2, 3, 4 and/or 5;
L is $C_xH_{2x}$ with x=2, 3, 4 or 5, or is $CH_2CH(C_6H_5)$;
a is an integer from 2 to 350;
d is an integer from 1 to 350;
$R^{19}$ is H or an unbranched or branched $C_1$-$C_4$ alkyl group;
$R^{20}$ is H or an unbranched $C_1$-$C_4$ alkyl group; and
n is 0, 1, 2, 3, 4 or 5;

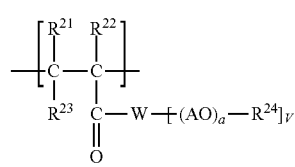 (IIc)

in which
$R^{21}$, $R^{22}$ and $R^{23}$ independently of one another are H or an unbranched or branched $C_1$-$C_4$ alkyl group;
W is O, $NR^{25}$, or is N;
V is 1 if W=O or $NR^{25}$, and is 2 if W=N;
A is an unbranched or branched alkylene with 2 to 5 carbon atoms or $CH_2CH(C_6H_5)$;
a is an integer from 2 to 350;
$R^{24}$ is H or an unbranched or branched $C_1$-$C_4$ alkyl group;
$R^{25}$ is H or an unbranched or branched $C_1$-$C_4$ alkyl group;

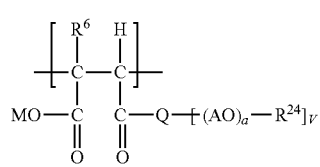 (IId)

in which

R⁶ is H or an unbranched or branched $C_1$-$C_4$ alkyl group;
Q is $NR^{10}$, N or O;
V is 1 if W=O or $NR^{10}$ and is 2 if W=N;
$R^{10}$ is H or an unbranched or branched $C_1$-$C_4$ alkyl group;
A is an unbranched or branched alkylene with 2 to 5 carbon atoms or $CH_2CH(C_6H_5)$; and
a is an integer from 2 to 350.

In an embodiment, the polymeric dispersant is a phosphorylated polycondensation product comprising structural units (III) and (IV):

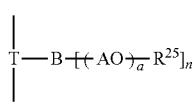
(III)

in which

T is a substituted or unsubstituted phenyl or naphthyl radical or a substituted or unsubstituted heteroaromatic radical having 5 to 10 ring atoms, of which 1 or 2 atoms are heteroatoms selected from N, O and S;
n is 1 or 2;
B is N, NH or O, with the proviso that n is 2 if B is N and with the proviso that n is 1 if B is NH or O;
A is an unbranched or branched alkylene with 2 to 5 carbon atoms or $CH_2CH(C_6H_5)$;
a is an integer from 1 to 300;
$R^{25}$ is H, a branched or unbranched $C_1$ to $C_{10}$ alkyl radical, $C_5$ to $C_8$ cycloalkyl radical, aryl radical, or heteroaryl radical having 5 to 10 ring atoms, of which 1 or 2 atoms are heteroatoms selected from N, O and S;
where the structural unit (IV) is selected from the structural units (IVa) and (IVb):

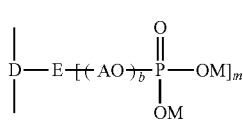
(IVa)

in which

D is a substituted or unsubstituted phenyl or naphthyl radical or a substituted or unsubstituted heteroaromatic radical having 5 to 10 ring atoms, of which 1 or 2 atoms are heteroatoms selected from N, O and S;
E is N, NH or O, with the proviso that m is 2 if E is N and with the proviso that m is 1 if E is NH or O;
A is an unbranched or branched alkylene with 2 to 5 carbon atoms or $CH_2CH(C_6H_5)$;
b is an integer from 0 to 300;
M independently at each occurrence is H or a cation equivalent;

(IVb)

in which

V is a substituted or unsubstituted phenyl or naphthyl radical and is optionally substituted by 1 or two radicals selected from $R^8$, OH, $OR^8$, $(CO)R^8$, COOM, $COOR^8$, $SO_3R^8$ and $NO_2$;
$R^7$ is COOM, $OCH_2COOM$, $SO_3M$ or $OPO_3M_2$;
M is H or a cation equivalent; and
$R^8$ is $C_1$-$C_4$ alkyl, phenyl, naphthyl, phenyl-$C_1$-$C_4$ alkyl or $C_1$-$C_4$ alkylphenyl.

The polymeric dispersants comprising structural units (I) and (II) can be prepared by conventional methods, for example by free radical polymerization. The preparation of the dispersants is, for example, described in EP0894811, EP1851256, EP2463314, and EP0753488.

In a preferred embodiment, the dispersant is a polymer comprising a sulfonic acid and/or sulfonate group. In an embodiment, the polymeric dispersant comprising sulfonic acids and/or sulfonates and is selected from the group consisting of lignosulfonates (LGS), melamine formaldehyde sulfonate condensates (MFS), ß-naphthalene sulfonic acid condensates (BNS), sulfonated ketone-formaldehyde-condensates and copolymers comprising sulfo group containing units and/or sulfonate group-containing units and carboxylic acid and/or carboxylate group-containing units.

The lignosulfonates used as polymeric sulfonated dispersants are products, which are obtained as by-products of the paper industry. Such products are described in Ullmann's Encyclopedia of Industrial Chemistry, 5th Ed., Vol. A8, pages 586, 587. They comprise units of the strongly simplified and idealized formula

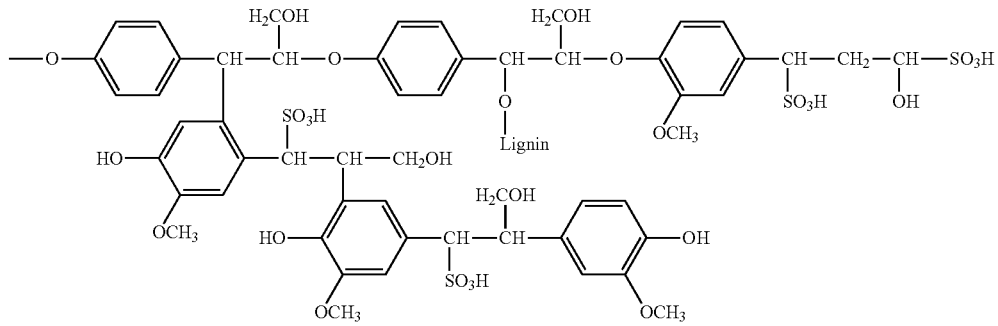

wherein n is usually 5 to 500. Lignosulfonates have usually molecular weights between 2.000 and 100.000 g/mol. Generally they are present in the form of their sodium-, calcium-, and/or magnesium salts. Examples for suitable lignosulfonates are the products marketed under the trade name Borresperse of the Norwegian company Borregaard LignoTech.

The melamine-formaldehyde-sulfonate condensates (also called MFS-resins) and their preparation are for example described in CA 2 172 004 A1, DE 44 11 797 A1, U.S. Pat. Nos. 4,430,469, 6,555,683 and CH 686 186, as well as in "Ullmann's Encyclopedia of Industrial Chemistry, 5th Ed., Vol. A2, page 131" and "Concrete Admixtures Handbook—Properties, Science and Technology, 2nd Ed., pages 411, 412". Preferred melamine-formaldehyde-sulfonate condensates comprise (strongly simplified and idealized) units of the formula

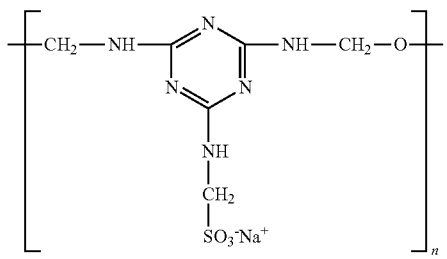

Melamine formaldehyde sulfite (PMS)

wherein n is typically a number from 10 to 300. The molecular weight is preferably in the region from 2.500 to 80.000 g/mol. An example for melamine-formaldehyde-sulfonate condensates are products marketed by the company BASF Construction Solutions GmbH under the trade name Melment®.

In addition to the sulfonated melamine units additional monomers can be co-condensated. In particular urea is suitable. Furthermore aromatic building units like gallic acid, aminobenzene sulfonic acid, sulfanilic acid, phenol sulfonic acid, aniline, ammonium benzoic acid, dialkoxybenzene sulfonic acid, dialkoxybenzoic acid, pyridine, pyridine monosulfonic acid, pyridine disulfonic acid, pyridine carboxylic acid and pyridine dicarboxylic acid can be co-condensated into the melamine-formaldehyde-sulfonate condensates.

The sulfonated ketone-formaldehyde are products in which as ketone component a mono- or diketone is used. Preferably acetone, butanone, pentanone, hexanone or cyclohexanone are built into the polymer. Such condensates are known and for example described in WO 2009/103579. Preferable are sulfonated acetone-formaldehyde-condensates. They comprise typically units of the formula (according to J. Plank et al., J. Appl. Poly. Sci. 2009, 2018-2024):

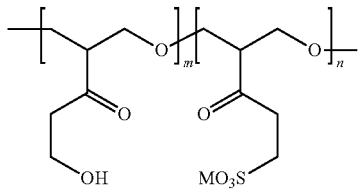

wherein m and n are typically an integer from 10 to 250, M is an alkali metal ion, for example Na$^+$, and the ratio of m:n is generally in the region from about 3:1 to about 1:3, in particular from about 1,2:1 to about 1:1,2. Examples for suitable acetone-formaldehyde-condensates are products, which are marketed by the company BASF Construction Solutions GmbH under the trade name Melcret® K1L.

Furthermore aromatic building units like gallic acid, aminobenzene sulfonic acid, sulfanilic acid, phenol sulfonic acid, aniline, ammonium benzoic acid, dialkoxybenzene sulfonic acid, dialkoxybenzoic acid, pyridine, pyridine monosulfonic acid, pyridine disulfonic acid, pyridine carboxylic acid and pyridine dicarboxylic acid can be co-condensated.

The -naphthaline-formaldehyde-condensates (BNS) are products, which are obtained by a sulfonation of naphthaline and followed by a polycondensation with formaldehyde. Such products are described amongst others in "Concrete Admixtures Handbook—Properties, Science and Technology, 2nd Ed., pages 411-413" and "Ullmann's Encyclopedia of Industrial Chemistry, 5th Ed., Vol. A8, pages 587, 588". They comprise units of the formula

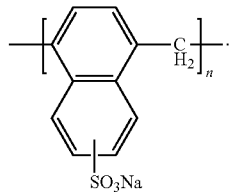

Typically the molecular weight ($M_w$) is from 1.000 to 50.000 g/mol.

Examples for suitable •-naphthaline-formaldehyde-condensates are the products marketed by the company BASF Construction Solutions GmbH under the trade name Melcret® 500 L. Furthermore aromatic building units like gallic acid, aminobenzene sulfonic acid, sulfanilic acid, phenol sulfonic acid, aniline, ammonium benzoic acid, dialkoxybenzene sulfonic acid, dialkoxybenzoic acid, pyridine, pyridine monosulfonic acid, pyridine disulfonic acid, pyridine carboxylic acid and pyridine dicarboxylic acid can be co-condensated.

In a further embodiment, the dispersant is a copolymer comprising sulfo group containing units and/or sulfonate group-containing units and carboxylic acid and/or carboxylate group-containing units. In an embodiment, the sulfo or sulfonate group containing units are units derived from vinylsulfonic acid, methallylsulfonic acid, 4-vinylphenyl-sulfonic acid or are sulfonic acid-containing structural units of formula

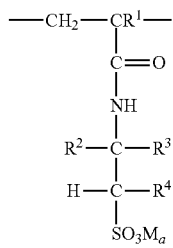

wherein
$R^1$ represents hydrogen or methyl
$R^2$, $R^3$ and $R^4$ independently of each other represent hydrogen, straight or branched $C_1$-$C_6$-alkyl or $C_6$-$C_{14}$-aryl,
M represents hydrogen, a metal cation, preferably a monovalent or divalent metal cation, or an ammonium cation a represents 1 or 1/valency of the cation, preferably ½ or 1.

Preferred sulfo group containing units are derived from monomers selected from vinylsulfonic acid, methallylsulfonic acid, and 2-acrylamido-2-methylpropylsulfonic acid (AMPS) with AMPS being particularly preferred.

The carboxylic acid or carboxylate containing units are preferably derived from monomers selected from acrylic acid, methacrylic acid, 2-ethylacrylic acid, vinyl acetic acid, crotonic acid, maleic acid, fumaric acid, itaconic acid, citraconic acid, and in particular acrylic acid and methacrylic acid.

The sulfo group containing copolymer in general has a molecular weight $M_w$ in the range from 1000 to 50.000, preferably 1500 to 30.000, as determined by aqueous gel permeation chromatography.

In an embodiment, the molar ratio between the sulfo group containing units and carboxylic acids containing units is, in general, in the range from 5:1 to 1:5, preferably 4:1 to 1:4.

Preferably the (co)polymer having carboxylic acid groups and/or carboxylate groups and sulfonic acid groups and/or sulfonate groups has a main polymer chain of carbon atoms and the ratio of the sum of the number of carboxylic acid groups and/or carboxylate groups and sulfonic acid groups and/or sulfonate groups to the number of carbon atoms in the main polymer chain is in the range from 0.1 to 0.6, preferably from 0.2 to 0.55. Preferably said (co)polymer can be obtained from a free-radical (co)polymerisation and the carboxylic acid groups and/or carboxylate groups are derived from monocarboxylic acid monomers. Preferred is a (co)polymer, which can be obtained from a free-radical (co)polymerisation and the carboxylic acid groups and/or carboxylate groups are derived from the monomers acrylic acid and/or methacrylic acid and the sulfonic acid groups and/or sulfonate groups are derived from 2-acrylamido-2-methylpropanesulfonic acid. Preferably the weight average molecular weight $M_w$ of the (co)polymer(s) is from 8 000 g/mol to 200 000 g/mol, preferably from 10 000 to 50 000 g/mol. The weight ratio of the (co)polymer or (co)polymers to the calcium silicate hydrate is preferably from 1/100 to 4/1, more preferably from 1/10 to 2/1, most preferably from 1/5 to 1/1.

It is also possible to use mixtures of the before mentioned dispersants, for example mixtures of lignosulfonates (LGS), melamine formaldehyde sulfonate condensates (MFS), beta-naphthalene sulfonic acid condensates (BNS), copolymer comprising sulfo group containing units and/or sulfonate group-containing units and carboxylic acid and/or carboxylate group-containing units, sulfonated keton-formaldehyde-condensates, polycarboxylate ethers (PCE), and/or phosphorylated polycondensates. A preferred mixture comprises copolymers comprising sulfo group containing units and/or sulfonate group-containing units and carboxylic acid and/or carboxylate group-containing units and/or phosphorylated polycondensates.

In an embodiment, the dispersant is a) a non-ionic copolymer for extending workability to the construction chemical compositions in the form of a paste (cementitious mixture), wherein the copolymer comprises residues of at least the following monomers: Component A comprising an ethylenically unsaturated carboxylic acid ester monomer comprising a moiety hydrolysable in the cementitious mixture, wherein the hydrolysed monomer residue comprises an active binding site for a component of the cementitious mixture; and Component B comprising an ethylenically unsaturated carboxylic acid ester or alkenyl ether monomer comprising at least one $C_{2-4}$ oxyalkylene side group of 1 to 350 units or b) a phosphonate-containing polymer of the formula

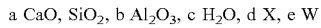

wherein

R is H or a saturated or unsaturated hydrocarbon group, preferably a $C_1$ to $C_{15}$ radical, A is the same or different and independently from each other an alkylene with 2 to 18 carbon atoms, preferably ethylene and/or propylene, most preferably ethylene, N is an integer from 5 to 500, preferably 10 to 200, most preferably 10 to 100, and M is H, an alkali metal, ½ alkaline earth metal and/or amine.

In an embodiment, the construction chemical compositions additionally include conventional retarders, such as citric acid, tartaric acid, etc.

In another embodiment, the compositions comprise at least one hardening accelerator. A preferred hardening accelerator is a calcium-silicate-hydrate (CSH) based hardening accelerator for compositions comprising OPC.

The calcium-silicate-hydrate may contain foreign ions, such as magnesium and aluminum. The calcium-silicate-hydrate can be preferably described with regard to its composition by the following empirical formula:

a CaO, $SiO_2$, b $Al_2O_3$, c $H_2O$, d X, e W

X is an alkali metal
W is an alkaline earth metal

| | | |
|---|---|---|
| $0.1 \leq a \leq 2$ | preferably | $0.66 \leq a \leq 1.8$ |
| $0 \leq b \leq 1$ | preferably | $0 \leq b \leq 0.1$ |
| $1 \leq c \leq 6$ | preferably | $1 \leq c \leq 6.0$ |
| $0 \leq d \leq 1$ | preferably | $0 \leq d \leq 0.4$ or $0.2$ |
| $0 \leq e \leq 2$ | preferably | $0 \leq e \leq 0.1$ |

Calcium-silicate-hydrate can be obtained preferably by reaction of a calcium compound with a silicate compound, preferably in the presence of a polycarboxylate ether (PCE). Such products containing calcium-silicate-hydrate are for example described in WO 2010/026155 A1, EP 14198721, WO 2014/114784 or WO 2014/114782.

Preferable is a composition, preferably dry mortar composition, in which the calcium-silicate-hydrate based hardening accelerator for cementitious compositions is a powder product. Powder products are advantageous as they are naturally high in contents of calcium-silicate-hydrate. In particular there are no compatibility problems with for example cement or other hydraulic binders, which might react with water from the aqueous calcium-silicate-hydrate containing suspension during storage.

The water content of the calcium-silicate-hydrate based hardening accelerator in powder form is preferably from 0.1 weight % to 5.5 weight % with respect to the total weight of the powder sample. Said water content is measured by putting a sample into a drying chamber at 80° C. until the weight of the sample becomes constant. The difference in weight of the sample before and after the drying treatment is the weight of water contained in the sample. The water content (%) is calculated as the weight of water contained in the sample divided with the weight of the sample.

A composition is preferred in which the calcium-silicate-hydrate based hardening accelerator is an aqueous suspension. The water content of the aqueous suspension is preferably from 10 weight % to 95 weight %, preferably from 40 weight % to 90 weight %, more preferably from 50 weight % to 85 weight %, in each case the percentage is given with respect to the total weight of the aqueous suspension sample. The water content is determined in an analogous way as described in the before standing text by use of a drying chamber.

Further useful hardening accelerators for aluminate-containing cements are calcium formate, calcium nitrate, calcium chloride, calcium hydroxide, lithium carbonate and lithium sulfate.

Further useful hardening accelerators for inorganic binders selected from calciumsulfate hemihydrate and/or anhydrite are potassium sulfate, sodium sulfate and ground gypsum (known to the skilled person as ball mill accelerator).

The construction chemical composition may additionally contain an essentially aluminate-free cement, anionic starch ethers, cellulose ethers, a redispersible polymer powder, and fillers or a mixture of two or more thereof. The term "essentially free" means here less than 5 wt %, preferably less than 3 wt % and in particular less than 1 wt %, based on the weight of the aluminate-containing cement.

An anionic starch ether is in particular carboxymethyl starch ether. Cellulose ethers are preferably selected from the group consisting of methylcellulose, ethylcellulose, propylcellulose, methylethylcellulose, hydroxyethylcellulose (HEC), hydroxypropylcellulose (HPC), hydroxyethylhydroxypropylcellulose, methylhydroxyethylcelluose (MHEC), methylhydroxypropylcelluose (MHPC) and propylhydroxypropylcellulose or mixtures of two or more thereof and in particular from the group consisting of carboxymethyl cellulose, methyl cellulose, methyl hydroxypropyl cellulose, methyl hydroxyethyl cellulose or mixtures of two or more thereof.

Redispersible polymer powders are preferably selected from the group consisting of vinyl acetate polymer, vinyl acetate-ethylene copolymer, vinyl acetate-vinyl ester copolymer and/or vinyl acetate-vinyl ester-ethylene copolymer, with the vinyl ester monomers in each case being selected from the group consisting of vinyl laurate, vinyl pivalate and vinyl versatates, vinyl acetate-acrylic ester copolymer, vinyl acetate-acrylic ester-ethylene copolymer, styrene-butadiene copolymer and styrene-acrylic ester copolymer, with the acrylic esters in each case being esters with branched or linear alcohols containing from 1 to 10 carbon atoms and in particular from the group consisting of styrene acrylate copolymer, polyvinyl acetate, styrene butadiene copolymer or mixtures of two or more thereof.

Fillers are preferably inert materials, which do not act as binder and basically do not dissolve in water. The solubility in water is preferably below 3 g/l at 20° C. and normal pressure. Preferred fillers are limestone, quartz flower, sand, silica dust, silicic acid, calcium silicate, layered silicates such as kaolin or bentonite, and basalt powder. Fillers can be preferably present in the composition from 1 weight % to 80 weight %, preferably from 10 weight % to 80 weight %, more preferably 30 weight % to 70 weight % with respect to the total weight of the composition.

In an embodiment, the construction chemical composition is in form of a powder mixture.

In another embodiment, the invention relates to a construction chemical composition comprising
a) the mixture of the invention as defined above, and
b) aluminate-containing cements.

The content of a) in this embodiment is 0.01 wt.-%-5.0 wt.-% by weight of b).

In another embodiment, the invention relates to a construction chemical composition comprising
a) the mixture of the invention as defined above, and
b) ordinary Portland cement.

The content of a) in this embodiment is 0.01 wt.-%-5.0 wt.-% by weight of b).

In another embodiment, the invention relates to a construction chemical composition comprising
a) the mixture of the invention as defined above, and
b) calcium sulfate hemihydrate or anhydrite.

The content of a) in this embodiment is 0.01 wt.-%-5.0 wt.-% by weight of b).

In another embodiment, the invention relates to a construction chemical composition comprising
a) the mixture of the invention as defined above,
b) ordinary Portland cement, and
c) aluminate cement, in particular high alumina cement and sulfoaluminate cement and mixtures thereof.

The content of a) in this embodiment is 0.01 wt.-%-5.0 wt.-% by weight of sum of b) and c). The content of the sum of b) and c) in the construction chemical composition is 10-95 wt.-%. The weight ratio b)/c) is 1/99 to 99/1, preferably 5/95 to 95/5.

In another embodiment, the invention relates to a construction chemical composition comprising
a) the mixture of the invention as defined above,
b) ordinary Portland cement,
c) aluminate cement, in particular high alumina cement and sulfoaluminate cement and mixtures thereof; and
d) calcium sulfate, in particular calcium sulfate dihydrate, calcium sulfate hemihydrate or anhydrite.

The content of a) in this embodiment is 0.01 wt.-%-5.0 wt.-% by weight of sum of b), c), and d). The content of the sum of b), c), and d) in the construction chemical composition is 10-95 wt.-%. The weight ratio b)/c) is 1/99 to 99/1, preferably 5/95 to 95/5. The weight ratio c)/d) is 100/1 to 2/1.

In another embodiment, the invention relates to a construction chemical composition comprising
a) the mixture of the invention as defined above,
b) ordinary Portland cement, c) aluminate cement, in particular high alumina cement and sulfoaluminate cement and mixtures thereof;
c) aluminate cement, in particular high alumina cement and sulfoaluminate cement and mixtures thereof; and
d) a copolymer comprising sulfo group containing units and carboxylic acids containing units as defined above.

The content of a) in this embodiment is 0.01 wt.-%-5.0 wt.-% by weight of sum of b) and c). The content of d) is 0.01 wt.-%-5.0 wt.-% by weight of sum of b) and c). The content of the sum of b) and c) in the construction chemical composition is 10-95 wt.-%. The weight ratio b)/c) is 1/99 to 99/1, preferably 5/95 to 95/5.

In another embodiment, the invention relates to a construction chemical composition comprising
a) the mixture of the invention as defined above,
b) ordinary Portland cement,
c) aluminate cement, in particular high alumina cement and sulfoaluminate cement and mixtures thereof;
d) calcium sulfate, in particular calcium sulfate dihydrate, calcium sulfate hemihydrate or anhydrite; and
e) a copolymer comprising sulfo group containing units and carboxylic acids containing units as defined above.

The content of a) in this embodiment is 0.01 wt.-%-5.0 wt.-% by weight of sum of b), c), and d). The content of e) is 0.01 wt.-%-5.0 wt.-% by weight of sum of b), c), and d). The content of the sum of b), c), and d) in the construction chemical composition is 10-95 wt.-%. The weight ratio b)/c) is 1/99 to 99/1, preferably 5/95 to 95/5. The weight ratio c)/d) is 100/1 to 2/1.

The invention also concerns the use of the mixture of the invention as a retarder for aluminate-containing building material formulations and/or for producing building products, in particular for concretes such as on-site concrete, finished concrete parts, pre-cast concrete parts, concrete goods, cast concrete stones, concrete bricks, in-situ concrete, sprayed concrete (shotcrete), ready-mix concrete, air-placed concrete, concrete repair systems, industrial cement flooring, one-component and two-component sealing slurries, screeds, filling and self-leveling compositions, such as joint fillers or self-leveling underlayments, adhesives, such as building or construction adhesives, thermal insulation composite system adhesives, tile adhesives, renders, plasters, adhesives, sealants, coating and paint systems, in particular for tunnels, waste water drains, splash protection and condensate lines, screeds, mortars, such as dry mortars, sag resistant, flowable or self-leveling mortars, drainage mortars, or repair mortars, grouts, such as joint grouts, non shrink grouts, tile grouts, wind-mill grouts, anchor grouts, flowable or self-leveling grouts, ETICS (external thermal insulation composite systems), EIFS grouts (Exterior Insulation Finishing Systems), swelling explosives, waterproofing membranes or cementitious foams.

The following examples illustrate the invention.

Component a1: Synthesized as Follows 148 g glyoxylic acid hydrate (50% in water) were charged into a reaction vessel and mixed with 594 g ethanol. 380 g sodium pyrosulfite ($Na_2S_2O_5$) dissolved in 750 g of water were then added to the mixture. After stirring for 4 h the obtained suspension was cooled to 1° C. and allowed to stand for 24 h. The product crystallized and was isolated and dried. It was characterized by means of NMR.

Component a2: Synthesized as Follows 1 eq. NaOH (50% in water) was added to 1 eq. of glyoxylic acid (50% solution in water) with stirring. The reaction mixture was cooled to 20° C. The precipitated product was filtered off and dried in a circulating air oven at 40° C. The product had a purity of >95% (IR-spectroscopy).

Component a3: Tartaric Acid

Synthesis of Dispersant 1

190 g of water were poured into a three-necked flask. 90 g of AMPS (2-acrylamido-2-methylpropanesulfonic acid, 31 g of acrylic acid and 1.6 g of 3-mercaptopropionic acid were added at 30° C. the pH of the reaction mixture was adjusted to 3. Then, 2 g of Waco V 50 (2,2'-azobis(2-amidinopropane)dihydrochloride; available from Sigma-Aldrich) were added and the solution was heated to 80° C. and stirred for 2 h at this temperature.

The molecular weight (Mw) of the resulting polymer was 12000 g/mol, determined by aqueous GPC.

Synthesis of Dispersant 2

45 g of water were poured into a three-necked flask. 25.24 g of AMPS, 31.25 g of acrylic acid and 2.5 g of 3-mercaptopropionic acid were added at 30° C. The pH of the reaction mixture was adjusted to 3. Then, 2 g of Waco V 50 were added and the solution was heated to 80° C. and stirred for 2 h at this temperature.

The molecular weight (Mw) of the resulting polymer was 6500 g/mol, determined by aqueous GPC.

Synthesis of Dispersant 3:

Dispersant 3 was synthesized according to DE2359291C2, example 1. The solid content of the resulting polymer solution was 45.1 wt.-%.

Synthesis of Dispersant 4 and Dispersant 5:

General Method, in Particular for Producing Dispersant 4 and Dispersant 5:

875 g of a 40% strength aqueous solution of polyethylene glycol hydroxybutyl monovinyl ether (PEG-HBVE) and NaOH (20%) are placed in a 1 litre four-neck flask provided with thermometer, reflux condenser and a connection for two feed streams. Details of the molar masses of the respective polyethylene glycol hydroxybutyl monovinyl ethers may be found in Table 2. The solution is then cooled to 20° C. Acrylic acid (99%) is then slowly added to the polyethylene glycol hydroxybutyl monovinyl ether solution in the flask. The pH decreases to about 4-5. 0.5 g of iron(II) sulfate heptahydrate and 5 g of Rongalit and mercaptoethanol are then added thereto. After brief stirring, 3 g of 50% hydrogen peroxide are then introduced. This results in the temperature rising from 20° C. to about 30° C.-65° C. The solution is subsequently stirred for 10 minutes before being neutralized with sodium hydroxide solution (20%). This gives a light-yellow, clear aqueous polymer solution having a solids content of about 40% by weight. All variable amounts indicated for the chemicals used in the preparation of the polycarboxylate ethers (NaOH, mercaptoethanol and acrylic acid) and the molar masses of the respective polyethylene glycol hydroxybutyl monovinyl ether are shown in Tables 1 and 2 below.

TABLE 1

Details of the preparation of Dispersants 4 and 5

| Dispersant | NaOH (20%) [g] | Mercaptoethanol [g] | Acrylic acid (99%) [g] |
|---|---|---|---|
| Dispersant 4 | 10 | 1.7 | 42.4 |
| Dispersant 5 | 20 | 2.7 | 84.9 |

TABLE 2

Overview of the structural parameters of Dispersants 4 and 5

| Dispersant | Charge density[1] | Weight average molecular weight $M_w$ (g/mol) | Molar mass of PEG-HBVE (g/mol) |
|---|---|---|---|
| Dispersant 4 | 1/672 | 28659 | 3000 |
| Dispersant 5 | 1/372 | 23239 | 3000 |

[1]number of mo es of carboxylate and/or carboxyl groups/total molar mass of the PCE (mol/(g/mol)

Other raw materials used in the examples and mortar compositions are given in table 3:

TABLE 3

Components/raw materials used in the examples and respective suppliers

| Type | Component | Supplier |
|---|---|---|
| Binder | Fondu (High Alumina Cement, HAC) | Kerneos |
| Binder | β-hemihydrate | Knauf |

TABLE 3-continued

Components/raw materials used in the examples and respective suppliers

| Type | Component | Supplier |
|---|---|---|
| Binder | Cement A (Ordinary Portland Cement), CEM I 52.5N, Blaine value: 4100 cm$^2$/g | HeidelbergCement AG |
| Binder | Cement B (Ordinary Portland Cement) CEM I 52.5N, Blaine value: 3600 cm$^2$/g | Schwenk Zement KG |
| Binder | GGBFS, Blaine value: 4500 cm$^2$/g | Orcem B. V. |
| Filler | Quartz sand (0.1-0.3 mm) | Quarzwerke Österreich GmbH |
| Filler | Quartz sand H33 | Quarzwerke Frechen |
| Filler | Limestone powder (Omyacarb 15 AL) | Omya |
| Component a3) | Tartaric Acid | BCK Bau-Chemie-Kontor GmbH |
| Additive | Citric Acid | Jungbunzlauer |
| Component a3) | Ethylene Carbonate | Sigma Aldrich GmbH |
| Additive | Diutan Gum (Vicosity modifying agent) | CP Keiko |
| Additive | Defoamer (Vinapor DF 9010) | BASF Construction Solutions GmbH |
| Additive | redispersible polymer powder (ethylene-vinylacetate polymer) (Vinnapas 5028 E) | Wacker |
| Additive | Methylcellulose (nonionic cellulose ether, Culminal C 4053) | Ashland |
| Additive | Foaming agent (Loxanol K12P) | BASF |
| Additive | Superabsorber (Starvis S 5514 F) | BASF |
| Additive | Thickener (Starvis 3040 F) | BASF |

EXAMPLE 1

Mortar Mix

For application tests a dry mortar was mixed based on the components summarized in Table 4:

TABLE 4

Mortar mix

| Type | Component | Weight (g) |
|---|---|---|
| Binder | Cement A | 492.75 |
| Binder | Fondu | 54.75 |
| Binder | β-hemihydrate | 21.90 |
| Filler | Quartz sand (0.1-0.3 mm) | 652.13 |
| Filler | Limestone powder | 300.00 |
|  | Water | 300.00 |

The additives according to the invention or for comparative purposes were added to the mortar mix given in Table 4. The additives were dissolved in the batching water before mixing the mortar.

The mixing was done according to following procedure:
1. Water (contains additives depending on the example) is added to the mixing vessel
2. Dry component is added to the water
3. Mixer (Toni Technik) is started and initial stirring is carried out for 1 min at mixing power 2
4. Stop mixing for 30 s
5. Start mixer again for 1 min at mixing power 2
6. Total stirring time: 2 min For characterization of the mortars different parameters were determined:
1. The setting time was determined according to the standard DIN EN 196-3. Begin of setting and final setting was determined with a 300 g needle (0.5 mm$^2$) at 23° C./50% relative humidity.
2. Compressive strength after 24 h: Fresh mortar is filled into a polystyrene form to produce 4×4×16 cm mortar prisms. The form is covered for 24 h and is stored at 23° C./50% relative humidity. After 24 h the compressive strength is measured on the prisms.
3. Surface hardness: Surface hardness is determined by Shore D measurement at 4 h, 5 h, and 6 h after mixing the dry components with water. The measurements are performed on samples which have a thickness of 5 mm and which were filled into a form directly after mixing.
4. For flowable mortar the initial flow of the mortar after mixing and the flow 10 min after mixing is determined according to DIN EN 12706. For determination of the flow after 10 min the mortar is filled into the cone directly after mixing. The mortar is not homogenized before determination of the flow value after 10 min.

1.1 Mortar with Non Flowable Properties

The formulation of table 4 was modified by addition of a mixture according to the invention by weight of the sum of dry components in table 4. For the dosage of component a) and the ethylene carbonate the inventive mixture 6 was the starting point. The dosage of component a1 and ethylene carbonate was chosen to achieve an initial setting after 30 min±5 min. This behavior is achieved at a dosage of 0.1 wt.-% for component a1 and ethylene carbonate. For comparison this dosage was chosen for mixtures 1 to 6 and 32 to 33. For mixture 30 and 31, the dosage of tartaric acid (component a3) was reduced by 50% compared to component a1 due to the known high efficiency of tartaric acid. The results are given in table 6.

Composition 1 is the blank mortar formulation from table 4 without any further additive. The strength after 24 hours achieves the target value but the initial setting occurs after 148 min which is later as the target. Additionally the Shore D values are smaller as required.

Compositions 2 and 3 represent a mortar formulation which contains only one component of the mixture according to the invention (ethylene carbonate or glyoxylic acid derivate). The different properties are close to the value of example 1.

Compositions 4, 30, 32 and 33 are comparative experiments with the state of the art accelerators tartaric acid and citric acid.

TABLE 5

Addition of additives to the mortar formulation given in table 4 (values are given in wt.-% by weight of the sum of dry components in the mortar mix according to table 4)

| Composition | Type | Component a1 (%) | Component a2 (%) | Component a3 (%) | Citric acid (%) | Ethylene carbonate (%) |
|---|---|---|---|---|---|---|
| 1 | Ref | 0 |  |  |  | 0 |
| 2 | Ref | 0.1 |  |  |  | 0 |
| 3 | Ref | 0 |  |  |  | 0.1 |

TABLE 5-continued

Addition of additives to the mortar formulation given in table 4 (values are given in wt.-% by weight of the sum of dry components in the mortar mix according to table 4)

| Composition | Type | Component a1 (%) | Component a2 (%) | Component a3 (%) | Citric acid (%) | Ethylene carbonate (%) |
|---|---|---|---|---|---|---|
| 30 | Ref | 0 | 0 | 0.05 | | 0 |
| 31 | Inv | 0 | 0 | 0.05 | | 0.1 |
| 4 | Ref | 0 | | 0.1 | | 0 |
| 32 | Ref | | | | 0.1 | 0 |
| 33 | Ref | | | | 0.1 | 0.1 |
| 6 | Inv | 0.1 | | | | 0.1 |
| 7 | Inv | 0.2 | | | | 0.2 |
| 8 | Inv | 0.1 | | | | 0.2 |
| 9 | Inv | 0.2 | | | | 0.1 |
| 10 | Inv | | 0.075 | | | 0.1 |
| 11 | Inv | | 0.15 | | | 0.2 |

Ref: Reference example
Inv: Example according to the invention

TABLE 6

Result for non flowable mortar test based on mortar formulations given in table 5:

| Composition | Type | Initial Setting (min) | Final Setting (min) | Setting Time (min) | 24 h CS (MPa) | Shore D 4 h | Shore D 5 h | Shore D 6 h |
|---|---|---|---|---|---|---|---|---|
| 1 | Ref | 148 | 174 | 26 | 23.5 | 11 | 17 | 25 |
| 2 | Ref | 157 | 182 | 25 | 22.4 | 11 | 25 | 28 |
| 3 | Ref | 117 | 152 | 35 | 22.3 | 14 | 27 | 28 |
| 30 | Ref | 20 | 36 | 16 | 20.5 | 20 | 22 | 24 |
| 31 | Inv | 51 | 69 | 18 | 17.0 | 33 | 35 | 42 |
| 4 | Ref | 69 | 77 | 8 | 5.61 | 26 | 34 | 36 |
| 32 | Ref | 29 | 40 | 11 | 4.9 | 23 | 29 | 32 |
| 33 | Inv | 122 | 148 | 26 | 12.7 | 20 | 25 | 32 |
| 6 | Inv | 28 | 37 | 9 | 22.3 | 22 | 27 | 30 |
| 7 | Inv | 106 | 126 | 20 | 22.5 | 15 | 21 | 32 |
| 8 | Inv | 28 | 38 | 10 | 20.5 | 28 | 32 | 37 |
| 9 | Inv | 39 | 52 | 13 | 20.6 | 32 | 36 | 40 |
| 10 | Inv | 18 | 27 | 9 | 21.1 | 28 | 33 | 37 |
| 11 | Inv | 42 | 57 | 15 | 23.4 | 36 | 38 | 42 |

CS: Compressive strength

A comparison of Compositions 2, 3 and 6 shows that the composition 6 of the invention provides a significantly reduced but sufficient open time and a significantly reduced setting time. Further, it provides a shorter strength development as can be seen from the Shore D values.

A comparison of Compositions 33 and 6 shows that the composition 6 of the invention provides a significantly reduced but sufficient open time and a significantly reduced setting time. Further, it provides a significantly increased 24 h compressive strength.

A comparison of compositions 4 and 31 shows that the beginning of setting is comparable. However, development of strength is increased when using the inventive hydration control mixture comprising component a1 and b) ethylene carbonate.

1.2 Mortar with Flowable Properties:

The formulation of table 4 was modified by addition of a mixture according to the invention. The aim was to provide a mortar which shows an initial setting after 40 min to 140 min and a compressive strength of >15 MPa after 24 hours. Further, a shore D value of >25 should be achieved after 6 hours. In addition, the flowable mortar should achieve an initial flow of >10 cm and the flow after 10 min should be also >10 cm. The final formulations with addition of retarder and plasticizer are summarized in table 7. The results are given in table 8.

The compositions according to the invention fulfill the requirements.

TABLE 7

Formulations for flowable mortar (values are given in wt.-% by weight of the sum of dry components in the mortar mix according to table 4)

| Composition | Type | Component a1 (%) | Component a2 (%) | Ethylene carbonate (%) | Dispersant 1 | Dispersant 2 | Dispersant 3 |
|---|---|---|---|---|---|---|---|
| 12 | Ref | 0.1 | | 0 | 0.05 | | |
| 13 | Ref | 0.2 | | 0 | 0.05 | | |
| 14 | Ref | 0 | | 0.1 | 0.05 | | |
| 15 | Ref | 0 | | 0.2 | 0.05 | | |
| 16 | Ref | 0 | | 0 | 0.05 | | |
| 17 | Inv | 0.1 | | 0.1 | 0.05 | | |
| 18 | Inv | 0.1 | | 0.2 | 0.05 | | |
| 19 | Inv | 0.2 | | 0.1 | 0.05 | | |
| 20 | Inv | | 0.075 | 0.1 | | 0.05 | |
| 21 | Inv | | 0.15 | 0.2 | | 0.05 | |
| 24 | Inv | 0.1 | | 0.1 | | | 0.11 |
| 25 | Inv | 0.1 | | 0.1 | | | 0.16 |
| 26 | Inv | 0.1 | | 0.1 | | | 0.23 |
| 23 | Ref | | | | | 0.05 | |

TABLE 8

Result for flowable mortar test based on mortar formulations given in table 4:

| Composition | Type | Initial flow $F_i$ after mixing (cm) | Flow after 10 min $F_{10}$ (cm) | ΔFlow $F_{10}$-$F_i$ (cm) | Initial Setting (min) | Final Setting (min) | Setting Time (min) | 24 h CS (MPa) | Shore D 4 h | Shore D 5 h | Shore D 6 h |
|---|---|---|---|---|---|---|---|---|---|---|---|
| 12 | Ref | 10 | 5 | −5 | 40 | 50 | 10 | 25.1 | 19 | 21 | 24 |
| 13 | Ref | 17.7 | 5 | −12.7 | 28 | 37 | 9 | 24.1 | 24 | 28 | 33 |
| 14 | Ref | 7.5 | 5 | −2.5 | 52 | 65 | 13 | 25.2 | 18 | 20 | 24 |
| 15 | Ref | 6.7 | 5 | −1.7 | 39 | 50 | 11 | 24.9 | 25 | 29 | 34 |
| 16 | Ref | 6.9 | 5 | −1.9 | 176 | 200 | 24 | 24.9 | 10 | 15 | 24 |
| 17 | Inv | 15.2 | 13.1 | −2.1 | 51 | 67 | 16 | 22.2 | 25 | 30 | 34 |
| 18 | Inv | 13 | 10.4 | −2.6 | 112 | 135 | 23 | 18.4 | 12 | 20 | 28 |
| 19 | Inv | 13.5 | 12.7 | −0.8 | 82 | 115 | 33 | 17.6 | 18 | 26 | 36 |
| 20 | Inv | 17.6 | 16.0 | −1.6 | 62 | 79 | 17 | 18.2 | 28 | 33 | 35 |
| 21 | Inv | 18.7 | 16.4 | −2.3 | 136 | 169 | 33 | 17.0 | 12 | 30 | 38 |
| 24 | Inv | 10.3 | 9.0 | −1.3 | 43 | 58 | 15 | 18.4 | 22 | 30 | 35 |
| 25 | Inv | 12.4 | 11.6 | −0.8 | 50 | 64 | 14 | 19.4 | 23 | 28 | 32 |
| 26 | Inv | 15.3 | 16.6 | 1.3 | 57 | 72 | 15 | 20 | 22 | 27 | 32 |
| 23 | Ref | 6.1 | 5.0 | −1.1 | 172 | 192 | 20 | 22.3 | 8 | 13 | 18 |

EXAMPLE 2

Self Leveling Underlayment (SLU)

The mixtures according to the invention were used for a composition of a self leveling underlayment (SLU). The compositions of the different mortars are summarized in table 9:

TABLE 9

Mortar composition for a SLU composition (values are given in wt.-% by weight of the sum of mortar components).

| | Composition | | |
|---|---|---|---|
| | SLU1 | SLU2 | SLU3 |
| | | Type | |
| | Inv | Ref | Inv |
| Component | (%) | (%) | (%) |
| Cement A | 31.59 | 31.59 | 31.59 |
| Fondu | 3.51 | 3.51 | 3.51 |
| β-hemihydrate | 1.40 | 1.40 | 1.40 |
| Limestone powder | 19.23 | 19.23 | 19.23 |
| Quartz sand H33 | 41.91 | 41.98 | 41.91 |
| Latex Powder | 2.00 | 2.00 | 2.00 |
| Dispersant 1 | 0.045 | 0.045 | 0.045 |
| Ethylene carbonate | 0.086 | | 0.086 |
| Component a1 | 0.086 | | 0.086 |
| Component a3 (tartaric acid) | | 0.100 | |
| Dispersant 4 | 0.040 | 0.040 | |
| Dispersant 5 | | | 0.040 |
| Diutan Gum | 0.040 | 0.040 | 0.040 |
| Defoamer | 0.064 | 0.064 | 0.064 |
| Sum mortar components | 100.00 | 100.00 | 100.00 |
| Water | 20.00 | 20.00 | 20.00 |

The water content relates to the total sum of mortar components given in table 9.

The dry compositions given in table 9 were mixed with the amount of water (given in table 9) according to EN 1937 (mixing procedure with waiting time).

Mixing procedure: (Mortar mixer according EN196-1)

| Time after start | Duration | Description |
|---|---|---|
| 0'00" | | |
| 0'00"–0'20" | 20 s | Addition of powder and dispersants to the water |
| 0'20"–1'20" | 60 s | Stirring (140 U/min) |
| 1'20"–1'40" | 20 s | Clean mixer and bowl |
| 1'40"–2'40" | 60 s | Stirring (285 U/min) |
| 2'40"–7'40" | 300 s | Ripening time |
| 7'40"–7'55" | 15 s | Stirring (285 U/min) |

TABLE 10

Results of mortar testing of compositions from table 9

| | | Composition | | |
|---|---|---|---|---|
| Test method | Unit | SLU1 Inv | SLU2 Ref | SLU3 Inv |
| Flow after (according DIN EN 12706) | | | | |
| 8 min | cm | 16.1 | 15.9 | 16.2 |
| 15 min | cm | 15.9 | 15.3 | 16.1 |
| 30 min | cm | 13.0 | 13.7 | 14.0 |
| 45 min | cm | 7.2 | 7.0 | 10.4 |
| 60 min | cm | 3.0 | 3.0 | 3.0 |
| Setting (according to DIN EN 196-3) | | | | |
| Initial Setting | min | 111 | 114 | 100 |
| Final Setting | min | 142 | 152 | 131 |
| Shore D (according to DIN 53505) | | | | |
| 3 | h | 13 | 8 | 18 |
| 4 | h | 19 | 16 | 22 |
| 5 | h | 20 | 20 | 26 |
| 6 | h | 21 | 23 | 30 |
| 7 | h | 26 | 26 | 36 |
| 8 | h | 27 | 29 | 36 |

TABLE 10-continued

Results of mortar testing of compositions from table 9

| Test method | Unit | Composition | | |
|---|---|---|---|---|
| | | SLU1 Inv | SLU2 Ref | SLU3 Inv |
| Compressive strength after (according to DIN EN 196-1) | | | | |
| 1 d | MPa | 10.9 | 4.1 | 10.4 |
| 2 d | MPa | 19.9 | 11.0 | 19.3 |
| 7 d | MPa | 38.1 | 31.1 | 37.3 |
| 28 d | MPa | 41.8 | 32.7 | 43.4 |

SLU2 is a comparative example with tartaric acid as prior art retarder. The dosage of the hydration control mixture according to the invention comprising component a1 and ethylene carbonate in the example SLU1 was adapted to achieve an initial setting which is comparable to SLU2. Whereas the Shore D development is comparable in SLU1 and SLU2 the strength after 24 h and 48 h is very different between SLU 1 and SLU2: In SLU1 the compressive strength after 24 h and 48 h with the hydration control mixture according to the invention is much higher compared to SLU2.

Compositions SLU4 to SLU11

These examples were designed to show the synergistic effect of the mixture of the invention and the surprising advantage of the compositions of the invention over the prior art composition known from WO 00/14026 A2 and EP 650 940 A1. The constituents of the tested compositions are given in table 11 and the test results are given in table 12.

TABLE 11

Dry mortar formulations for SLU

| | Composition | | | | | | |
|---|---|---|---|---|---|---|---|
| | SLU4 | SLU5 | SLU6 | SLU4 R | SLU5R | SLU6R | SLU11 |
| Type | Inv | Inv | Ref | Ref | Ref | Ref | Ref |
| Component | (%) | (%) | (%) | (%) | (%) | (%) | (%) |
| Cement A | 31.59 | 31.59 | 31.59 | 31.59 | 31.59 | 31.59 | 31.59 |
| Fondu (HAC) | 3.51 | 3.51 | 3.51 | 3.51 | 3.51 | 3.51 | 3.51 |
| β-hemihydrate | 1.4 | 1.4 | 1.4 | 1.4 | 1.4 | 1.4 | 1.4 |
| Limestone powder | 19.23 | 19.23 | 19.23 | 19.23 | 19.23 | 19.23 | 19.23 |
| Quartz sand H33 | 41.91 | 41.98 | 41.91 | 41.98 | 41.91 | 41.98 | 41.98 |
| Latex Powder | 2 | 2 | 2 | 2 | 2 | 2 | 2 |
| Dispersant 1 | 0.027 | 0.027 | 0.027 | 0.027 | 0.027 | 0.027 | 0.027 |
| Ethylene carbonate | 0.025 | 0.025 | 0.025 | | | | |
| Sodium Carbonate | 0.1 | 0.1 | 0.1 | 0.1 | 0.1 | 0.1 | 0.1 |
| Component a1 Lithium Carbonate | 0.08 | | | 0.08 | | | |
| Citric Acid | | | 0.14 | | | 0.14 | |
| Component a3 (tartaric acid) | | 0.041 | | | 0.041 | | |
| Dispersant 4 | 0.05 | 0.05 | 0.05 | 0.05 | 0.05 | 0.05 | 0.05 |
| Diutan Gum | 0.04 | 0.04 | 0.04 | 0.04 | 0.04 | 0.04 | 0.04 |
| Defoamer (Vinapor DF9010) | 0.064 | 0.064 | 0.064 | 0.064 | 0.064 | 0.064 | 0.064 |
| Sum mortar components | 100 | 100 | 100 | 100 | 100 | 100 | 100 |
| Water | 20 | 20 | 20 | 20 | 20 | 20 | 20 |

TABLE 12

Results of mortar testing of compositions from table 11

| | | Composition | | | | | | |
|---|---|---|---|---|---|---|---|---|
| | | SLU4 | SLU5 | SLU6 | SLU4 R | SLU5 R | SLU6 R | SLU11 |
| Test method | Unit | Inv | Inv | Ref | Ref | Ref | Ref | Ref |
| Flow after (according to DIN EN 12706) | | | | | | | | |
| 8 min | cm | 15.8 | 15.9 | 15 | 15.8 | 14.8 | 14.3 | 8 |
| 15 min | cm | 15.9 | 15.8 | 15.2 | 15.2 | 11.2 | 6.5 | 5.2 |
| 30 min | cm | 15.6 | 15.8 | 15.3 | 13 | 3.1 | — | — |
| 45 min | cm | 15.4 | 15.5 | 14.4 | 10.5 | — | — | — |
| 60 min | cm | 14.3 | 7.2 | — | 6.4 | — | — | — |
| Setting (according to DIN EN 196-3) | | | | | | | | |
| Initial Setting | min | 143 | 118 | 136 | 113 | 112 | 88 | 91 |
| Final Setting | min | 163 | 140 | 169 | 141 | 122 | 134 | 176 |

TABLE 12-continued

Results of mortar testing of compositions from table 11

| | | Composition | | | | | | |
|---|---|---|---|---|---|---|---|---|
| | | SLU4 | SLU5 | SLU6 | SLU4 R | SLU5 R | SLU6 R | SLU11 |
| Shore D (according to DIN 53505) | | | | | | | | |
| 3 | h | 10 | 13 | 11 | 13 | 14 | 10 | 0 |
| 4 | h | 15 | 19 | 15 | 17 | 22 | 14 | 10 |
| 5 | h | 21 | 26 | 19 | 23 | 27 | 18 | 13 |
| 6 | h | 28 | 30 | 24 | 25 | 29 | 22 | 16 |
| 7 | h | 32 | 34 | 26 | 27 | 31 | 24 | 21 |
| Compressive strength after (according to DIN EN 196-1) | | | | | | | | |
| 1 d | MPa | 7.5 | 8 | 3.7 | 10.3 | 9.2 | 2.8 | 13.1 |
| 2 d | MPa | 15.3 | 16.1 | 10.4 | n.d. | n.d. | n.d. | n.d. |
| 7 d | MPa | 30.9 | 31.6 | 31.6 | n.d. | n.d. | n.d. | n.d. |
| 28 d | MPa | 42.8 | 44.2 | 41.2 | n.d. | n.d. | n.d. | n.d. | n.d. = not determined

TABLE 13

Dry mortar formulations for SLU

| | Composition | | | |
|---|---|---|---|---|
| | SLU7 | SLU8 | SLU9 | SLU10 |
| | Type | | | |
| | Inv | Ref | Ref | Ref |
| Component | (%) | (%) | (%) | (%) |
| Cement A | 31.59 | 31.59 | 31.59 | 31.59 |
| Fondu (HAC) | 3.51 | 3.51 | 3.51 | 3.51 |
| β-hemihydrate | 1.4 | 1.4 | 1.4 | 1.4 |
| Limestone powder | 19.23 | 19.23 | 19.23 | 19.23 |
| Quartz sand H33 | 41.98 | 41.91 | 41.98 | 41.98 |
| Latex Powder | 2 | 2 | 2 | 2 |
| Dispersant 1 | 0.027 | 0.027 | 0.027 | 0.027 |
| Ethylene carbonate | 0.025 | | | |
| Sodium Carbonate | 0.1 | | 0.1 | |
| Component a1 | 0.08 | | 0.1 | 0.15 |
| Lithium Carbonate | 0.1 | 0.1 | | |
| Citric Acid | | | | |
| Component a3 (tartaric acid) | | | | |
| Dispersant 4 | 0.05 | 0.05 | 0.05 | 0.05 |
| Diutan Gum | 0.04 | 0.04 | 0.04 | 0.04 |
| Defoamer (Vinapor DF9010) | 0.064 | 0.064 | 0.064 | 0.064 |
| Sum mortar components | 100 | 100 | 100 | 100 |
| Water | 20 | 20 | 20 | 20 |

TABLE 14

Results of mortar testing of compositions from table 13

| | | Composition | | | |
|---|---|---|---|---|---|
| Test method | Unit | SLU7 Inv | SLU8 Ref | SLU9 Ref | SLU10 Ref |
| Flow after (according to DIN EN 12706) | | | | | |
| 8 min | cm | 15.8 | 7.8 | 15.9 | 15 |
| 15 min | cm | 15.8 | 6.1 | 15.6 | 13.7 |
| 30 min | cm | 15.7 | 3.7 | 13.5 | 5.2 |
| 45 min | cm | 14.7 | 0 | 11.5 | 0 |
| 60 min | cm | 11.8 | 0 | 8.8 | 0 |
| Setting (according to DIN EN 196-3) | | | | | |
| Initial Setting | min | 140 | 158 | 132 | 57 |
| Final Setting | min | 172 | 296 | 152 | 67 |
| Shore D (according to DIN 53505) | | | | | |
| 3 | h | 10 | 0 | 0 | 18 |
| 4 | h | 17 | 0 | 15 | 24 |
| 5 | h | 28 | 0 | 21 | 27 |
| 6 | h | 37 | 11 | 27 | 29 |
| 7 | h | 44 | 17 | 29 | 31 |
| Compressive strength after (according to DIN EN 196-1) | | | | | |
| 1 d | MPa | 8.3 | 11.3 | 9.3 | 8.6 |

Compositions SLU 4R to 6R are the corresponding references to compositions SLU 4 to 6 without use of ethylene carbonate. Without ethylene carbonate the compositions show insufficient flow behavior over time; without ethylene carbonate in the compositions the time until the flow is sufficient is strongly reduced at similar early strength development (measured by Shore D).

Compositions SLU 4 to 6 are a comparison of mixtures according to the invention (SLU 4, 5) with a prior art mixture. As can be seen, the mixtures of the invention provide surprising advantages with regard to flow and 1 d and 2 d compressive strength.

EXAMPLE 3

3.1 CR0 to CR6: Pure Portland Cement Based Cementitious Formulation for Render

The following mortar compositions were used for the experiment which is reflecting a formulation of a sag resistant mortar for wall application (for example a cementitious render). They are given in table 15, the results are given in table 16.

TABLE 15

Mortar Composition (values in wt.-% by weight of the sum of moartar components)

| | Composition | | | | | | |
|---|---|---|---|---|---|---|---|
| | CR0 | CR1 | CR2 | CR3 | CR4 | CR5 | CR6 |
| Type | Ref | Inv | Inv | Inv | Ref | Ref | Ref |
| Components | | | | | | | |
| Cement B | 20.00 | 20.00 | 20.00 | 20.00 | 20.00 | 20.00 | 20.00 |
| Quartz sand 0.3-1.0 mm | 69.90 | 69.70 | 69.60 | 69.50 | 69.875 | 69.85 | 69.82 |
| Limestone Powder | 10.00 | 10.00 | 10.00 | 10.00 | 10.00 | 10.00 | 10.00 |
| Cellulose Ether | 0.07 | 0.07 | 0.07 | 0.07 | 0.07 | 0.07 | 0.07 |
| Foaming agent | 0.03 | 0.03 | 0.03 | 0.03 | 0.03 | 0.03 | 0.03 |
| Ethylene Carbonate | | 0.10 | 0.15 | 0.20 | | | |
| Component a1 | | 0.10 | 0.15 | 0.20 | | | |
| Component a3 (tartaric acid) | | | | | 0.025 | 0.05 | 0.08 |
| Sum mortar component | 100.00 | 100.00 | 100.00 | 100.00 | 100.00 | 100.00 | 100.00 |
| Water | 15.5 | 15.5 | 15.5 | 15.5 | 15.5 | 15.5 | 15.5 |

The water content relates to the total sum of all mortar components given in table 13.

The mortar was mixed in a Rilem Mixer (Toni Technik) at mixer speed 65 rpm for 60 s. The setting time was determined at 23° C. by Vicat cone (weight 100 g) and the strength development was measured by an ultrasonic measuring device. The results are summarized in table 14.

TABLE 16

Results of mortar test

| | Composition | | | | | | |
|---|---|---|---|---|---|---|---|
| | CR0 | CR1 | CR2 | CR3 | CR4 | CR5 | CR6 |
| Type | Ref | Inv | Inv | Inv | Ref | Ref | Ref |
| Initial Setting (min) | 302 | 378 | 123 | 188 | 22 | 63 | 354 |
| Final Setting (min) | 425 | 577 | 133 | 211 | 27 | 73 | 419 |

TABLE 16-continued

Results of mortar test

| | Composition | | | | | | |
|---|---|---|---|---|---|---|---|
| | CR0 | CR1 | CR2 | CR3 | CR4 | CR5 | CR6 |
| Time of reaching defined ultrasonic velocity (h) | | | | | | | |
| Velocity 200 m/s | 4.1 | 0.9 | 1.8 | 3.0 | 0.2 | 0.9 | 4.9 |
| Velocity 500 m/s | 6.7 | 12..0 | 2.1 | 3.4 | 0.6 | 1.0 | 5.9 |
| Velocity 1200 m/s | 11.8 | 19.1 | 19.8 | 23.0 | n.d. | n.d. | n.d. | n.d.—not achieved on 24 h

The results show that the inventive mixtures lead to a long open time (CR1 and CR3) but the final strength formation can nevertheless be achieved whereas in the retarded system with tartaric acid (CR4-CR6) the final strength (ultrasonic speed at 1200 m/s) is not achieved within 24 hours. The ultrasonic velocity reflects the formation of strength. The velocity increases if water is resorbed in the system under formation of hydrate phases. In comparable mortars the ultrasonic velocity correlates with strength, that means if a special ultrasonic velocity is achieved in different mixtures the strength in both mixtures at this time is comparable. The method of ultrasonic measurement is described in DIN EN 12504-4.

3.2 CR7 to CR13: Render Mortar Systems

The composition of the render systems is given in table 17. The dosage was adapted to achieve an initial stiffening time (100 g cone) of 60 min±10 min according to DIN EN 13279-2.

TABLE 17

Mortar Composition (values in wt.-% by weight of the sum of mortar components)

| | Composition | | | | | | |
|---|---|---|---|---|---|---|---|
| | CR7 | CR8 | CR9 | CR10 | CR11 | CR12 | CR13 |
| Type | Ref. | Inv | Ref | Ref | Inv | Ref | Ref |
| Components | | | | | | | |
| Cement B | 20.00 | 20.00 | 20.00 | 20.00 | 20.00 | 20.00 | 20.00 |
| Quartz sand 0.3-1.0 mm | 69.92 | 69.86 | 69.91 | 69.91 | 69.90 | 69.89 | 69.90 |
| Limestone Powder | 10.00 | 10.00 | 10.00 | 10.00 | 10.00 | 10.00 | 10.00 |
| Cellulose Ether | 0.07 | 0.07 | 0.07 | 0.07 | 0.07 | 0.07 | 0.07 |

TABLE 17-continued

Mortar Composition (values in wt.-% by weight of the sum of mortar components)

| | Composition | | | | | | |
|---|---|---|---|---|---|---|---|
| | CR7 | CR8 | CR9 | CR10 | CR11 | CR12 | CR13 |
| Foaming agent | 0.01 | 0.01 | 0.01 | 0.01 | 0.01 | 0.01 | 0.01 |
| Ethylene Carbonate | | 0.17 | | | 0.17 | 0.17 | 0.17 |
| Component a1 | | 0.17 | | | | | |
| Component a3 (tartaric acid) | | | 0.07 | | 0.07 | | |
| Citric Acid | | | | 0.11 | | 0.11 | |
| Sum mortar component | 100.00 | 100.00 | 100.00 | 100.00 | 100.00 | 100.00 | 100.00 |
| Water | 15.5 | 15.5 | 15.5 | 15.5 | 15.5 | 15.5 | 15.5 |

CR8 is a system according to the invention. CR9 and CR10 are presenting comparative compositions showing the influence of fruit acids (tartaric acid and citric acid) on the system without addition of organic carbonate. The addition of the fruit acids was adapted on the performance to achieve an initial setting time of about 60 min. CR11 is an inventive composition showing the use of tartaric acid in combination with ethylene carbonate whereas CR12 is a comparative example with citric acid in place of component a1.

Example CR13 shows the impact of ethylene carbonate alone.

TABLE 18

Results of mortar test

| Experiment | CR7 | CR8 | CR9 | CR10 | CR11 | CR12 | CR13 |
|---|---|---|---|---|---|---|---|
| Type | Ref. | Inv | Ref | Ref | Inv | Ref | Ref |
| Initial Setting (min) | 234 | 74 | 61 | 71 | 57 | 205 | 215 |
| Final Setting (min) | 474 | 154 | 168 | 141 | 144 | 288 | 487 |
| Compressive strength (in MPa) | | | | | | | |
| After 24 h | 1.7 | 2.1 | <d.l. | <d.l. | <d.l. | n.m. | 1.7 |
| Cumulated heat of hydration after 24 h | | | | | | | |
| HoH (J/g mortar) | 30.4 | 23.8 | 8.8 | 9.1 | 13.6 | 18.9 | 28.4 |

<d.l.—below detection limit (prisms are available but strength below detection limit
n.m.—not measureable (prism was too soft for measurement or was broken before measurement)

CR9 and CR10 shows no strength formation after 24 h at the same setting behavior like inventive composition CR8 and the cumulated heat of hydration (which represents strength formation) is much lower compared to CR8.

The combination of tartaric or citric acid with ethylene carbonate (CR11 and CR12) shows only in the case of CR11 a good setting behavior. CR12 is retarded too much resulting in a very low 24 h strength while heat of hydration is increased compared to inventive example CR11. Examples CR8 and CR11 show the surprisingly superior performance of the compositions of the invention over CR12 containing citric acid in place of component a1. This indicates that citric acid is disadvantageous in combination with organic carbonate. CR13 is a comparative example showing only the influence of ethylene carbonate: The 24 h strength is increased compared to the inventive examples but the setting behavior is much more different. The setting behavior is comparable to the mortar without additives (CR7) and hence does not fulfill the target of the invention.

EXAMPLE 4

Mortar with White Portland Cement

An OPC based mortar was produced and investigated with a base composition according to following table 19.

TABLE 19

| Dyckerhoff White Cem I 42.5 R | 400 |
|---|---|
| Quartz sand 0.3-1.0 mm | 500 |
| Limestone Powder | 100 |
| Water | 200 |

The amount of quartz sand was reduced by the weight of the additives used in the different formulations. Values in table 18 are wt.-% by weight of sum of dry components (OPC+Quartz sand+Limestone powder+additives). The results are given in table 20.

TABLE 20

| | Composition | | | | | | | | |
|---|---|---|---|---|---|---|---|---|---|
| | N3.1 Ref | N3.3 Comp | N3.4 Comp | N3.5 Comp | N3.9 Comp | N3.10 Comp | N3.8 Comp | N3.6 Comp | N3.7 Comp |
| component a1 | | | | | | | | | |
| Ethylene carbonate | | | | | | | | | |
| Component a3 (tartaric acid) | | 0.12 | | | | | | | |
| Citric acid | | | 0.16 | | | | | | |
| CSA (Belith CS 10) | | | | 0.5 | 1 | 2 | | | |
| HAC (Kerneos Fondu) | | | | | | | 0.5 | 1 | 2 |
| Initial Set (300 g needle) | 133 | 70 | 75 | 128 | 108 | 81 | 130 | 129 | 117 |
| Final Set (300 g needle) | 160 | 108 | 88 | 152 | 131 | 98 | 157 | 148 | 137 |

TABLE 20-continued

| Compressive Strength (6 h) | 15.1 | 2.4 | 1.9 | 17.2 | 18.0 | 19.6 | 16.7 | 17.2 | 17.9 |
|---|---|---|---|---|---|---|---|---|---|
| Compressive Strength (24 h) | 22.3 | 16.8 | 28.2 | 25.6 | 28.1 | 30.0 | 25.5 | 29.1 | 27.5 |

| | Composition | | | | | | |
|---|---|---|---|---|---|---|---|
| | N3.2 Inv | N3.11 Inv | N3.12 Inv | N3.13 Inv | N3.14 Inv | N3.15 Inv | N3.16 Inv |
| Component a1 | 0.25 | 0.25 | 0.25 | 0.25 | 0.25 | 0.25 | 0.25 |
| Ethylene carbonate | 0.25 | 0.25 | 0.25 | 0.25 | 0.25 | 0.25 | 0.25 |
| Component a3 (tartaric acid) | | | | | | | |
| Citric acid | | | | | | | |
| CSA (Belith CS 10) | | 0.5 | 1 | 2 | | | |
| HAC (Kerneos Fondu) | | | | | 0.5 | 1 | 2 |
| Initial Set (300 g needle) | 59 | 60 | 55 | 48 | 63 | 59 | 56 |
| Final Set (300 g needle) | 68 | 67 | 61 | 54 | 67 | 64 | 62 |
| Compressive Strength (6 h) | 12.7 | 15.2 | 16.0 | 18.6 | 13.6 | 15.5 | 16.7 |
| Compressive Strength (24 h) | 20.5 | 22.3 | 21.9 | 22.1 | 20.0 | 21.8 | 20.3 |

CSA: calcium sulfoaluminate cement
HAC: high alumina cement

N3.1 to N3.4 show mortar without additional aluminate source (CSA). In N3.3 and N3.4 dosage of tartaric or citric acid was adapted to achieve an initial setting (300 g needle) after 60 min±15 min. In comparison to inventive example N3.2 at comparable initial setting time the 6 h strength is reduced significantly.

Examples N3.5, N3.9 and N3.10 are comparative examples for the addition of CSA cement to the mortar in different amounts. The addition of CSA cement reduces the setting time to earlier times compared to the reference N3.1. With the addition of component a1 and ethylene carbonate (N3.11 to N3.13) the initial setting can be further reduced to the target of 60 min±15 min due to the controlled retardation of the initial aluminate reaction resulting from OPC and CSA. This control of setting time has an acceptable minor impact in 6 h compressive strength (is reduced only by 2 MPa). Additionally, the 6 h strength compared to the reference (mortar without additional aluminate source) is not negatively influenced. The 24 h strength is in the range of that one of the reference but the setting profile was changed in accordance with the goal of the invention.

A comparable behavior is observed with HAC as additional aluminate source (comparative examples N3.6 to N3.8; inventive examples N3.14 to N3.16)

EXAMPLE 5

Repair Mortar

Following example reflects a repair mortar formulation with flowable properties for floor application. The mortar should contain a good flow behavior over time (constant flow for one hour), fast setting after latest 2 hours and sufficient strength development (>10 MPa after 24 h). Inventive experiment RM2 shows sufficient slump flow over time compared to RM3 and increased compressive strength after 24 h compared to RM3. RM2 shows a wanted balanced hardening profile which enables good workability time (flow), fast setting and high early compressive strength after 24 h.

Mixing Procedure of Mortar (According to DIN EN 196-1):

| Time after start | Duration | Description |
|---|---|---|
| 0'00" | | |
| 0'00"-0'20" | 20 s | Addition of powder and additives to the water |
| 0'20"-2'20" | 120 s | Stirring (140 U/min) |
| 2'20"-3'20" | 60 s | Clean mixer and bowl |
| 3'20"-5'20" | 120 s | Stirring (140 U/min) |

TABLE 21

Mortar Composition (values in wt.-% by weight of the sum of mortar components)

| | Composition | | |
|---|---|---|---|
| | RM1 | RM2 | RM3 |
| Type | Ref. | Inv | Comp |
| Components | | | |
| Cement B | 30.0 | 30.0 | 30.0 |
| GGBFS | 3.5 | 3.5 | 3.5 |
| Quartz sand 0.3-1.0 mm | 53.1 | 69.9 | 69.9 |
| Limestone Powder | 13.0 | 13.0 | 13.0 |
| Starvis S 5514 F | 0.20 | 0.20 | 0.20 |
| Dispersant 5 | 0.10 | 0.10 | 0.10 |
| Defoamer Vinapor DF 9010 | 0.05 | 0.05 | 0.05 |
| Starvis 3040 F | 0.05 | 0.05 | 0.05 |
| Propylene Carbonate | — | 0.2 | — |
| Component a1 | — | 0.2 | — |
| Citric Acid | — | — | 0.2 |
| Sum mortar component | 100.00 | 100.00 | 100.00 |
| Water | 17.0 | 17.0 | 17.0 |
| Results of mortar tests | | | |
| Slump Flow(*1) (cm) after | | | |
| 5 min | 16.9 | 28.4 | 24.8 |
| 15 min | 14.0 | 27.8 | 19.2 |
| 30 min | 12.0 | 29.2 | 11.1 |
| 45 min | 11.3 | 27.8 | 10.4 |
| 60 min | 10.8 | 25.2 | 10.0 |

TABLE 21-continued

Mortar Composition (values in wt.-% by weight of the sum of mortar components)

| | Composition | | |
|---|---|---|---|
| | RM1 | RM2 Type | RM3 |
| | Ref. | Inv | Comp |
| 75 min | 10.6 | 22.0 | 10.0 |
| 90 min | 10.5 | 18.0 | 10.0 |
| Setting according to DIN EN 196-3 | | | |
| Initial Setting 100 g needle (min) | 213 | 95 | 37 |
| Final Setting 300 g needle (min) | 316 | 100 | 51 |
| Final Setting 1000 g needle (min) | 422 | 103 | 53 |
| Compressive strength after 24 h according to DIN EN 196-1 (MPa) | 17.9 | 13.4 | 3.9 |

(*1)Slump flow was determined according to DIN EN 1015-3 with the Hagermann cone. The mortar was remixed for 10 s before measurement of flow.

The invention claimed is:

1. A construction chemical composition, comprising:
a) a mixture comprising
A) at least one compound of formula I:

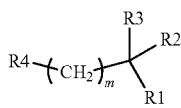

wherein
R1 is OH;
R2 is H, OH, $C_1$-$C_6$ alkoxy, —$SO_2$, X-$SO_3$X, —$OSO_3$X, —$PO_3X_2$, —COOX, —$OPO_3X_2$, —Z—COOX or —CH(OH)—$SO_3$X;
R3 is H, $C_1$-$C_6$ alkyl which may be substituted by 1 or 2 OH or $C_1$-$C_6$ alkoxy;
m is 0 or 1; or
R1 and R2 taken together with the carbon atom to which they are attached form a carbonyl group provided m is 0;
R4 is COOY or $SO_3$X;
X is selected from H or a cation equivalent $K_a$ wherein K is selected from an alkali metal, alkaline earth metal, zinc, iron, ammonium or phosphonium cation and a is 1/n wherein n is the valency of the cation;
Y= is selected from X, $C_1$-$C_6$ alkyl or phenyl; and
Z is $CH_2$ or CH(OH), and
B) at least one water-soluble organic carbonate; and
b) at least one inorganic binder selected from the group consisting of calcium sulfate hemihydrate, anhydrite, and aluminate-containing cements,
wherein a content of a) is 0.01 wt % to 5.0 wt % by weight of b).

2. The construction chemical composition of claim 1, wherein m is 0 and R2 is OH.

3. The construction chemical composition of claim 1, wherein R2 is —COOX.

4. The construction chemical composition of claim 1, wherein R3 is H.

5. The construction chemical composition of claim 1, wherein R4 is COOX.

6. The construction chemical composition of claim 1, wherein
a) m is 0, R2 is —$SO_3$X and R4 is —COOX;
b) m is 0, R2 is —COOX and R4 is —COOX;
c) m is 0, R2 is —Z—COOX and Z is $CH_2$ and R4 is —COOX;
d) m is 0, R2 is —Z—COOX and Z is —CH(OH) and R4 is —COOX;
e) m is 0; R1 and R2 taken together with the carbon atom to which they are attached form a carbonyl group and R4 is —COOX;
f) m is 0; R1 and R2 taken together with the carbon atom to which they are attached form a carbonyl group and R4 is —$SO_3$X; or
g) m is 0; R2 is —CH(OH)—$SO_3$X, and R4 is —$SO_3$X.

7. The construction chemical composition of claim 6, wherein in and R2 are as defined in a) to g) and R3 is H.

8. The construction chemical composition of claim 1, wherein Y is X.

9. The construction chemical composition of claim 1, wherein the water-soluble carbonate is at least one selected from the group consisting of ethylene carbonate, propylene carbonate, trimethylene carbonate, glycerol carbonate, dimethyl carbonate, and di(hydroxyethyl)carbonate.

10. The construction chemical composition of claim 9, wherein the water-soluble carbonate is ethylene carbonate, propylene carbonate or a mixture thereof.

11. The construction chemical composition of claim 1, wherein a weight ratio of component A) to component B) is in the range from 100:1 to 1:100.

12. The construction chemical composition of claim 1, additionally comprising at least one additive.

13. The construction chemical composition of claim 12, wherein the additive is at least one selected from the group consisting of inorganic carbonates, alkali metal sulfates, latent hydraulic binders, dispersants, and fillers.

14. The construction chemical composition of claim 13, wherein the additive is at least one inorganic carbonate.

15. The construction chemical composition of claim 14, wherein the inorganic carbonate is at least one selected from the group consisting of sodium carbonate, potassium carbonate, lithium carbonate, magnesium carbonate, calcium carbonate, and calcium-magnesium carbonate.

16. The construction chemical composition of claim 13, wherein the additive is at least one polymeric dispersant.

17. The construction chemical composition of claim 16, wherein the dispersant is a sulfonic acid and/or sulfonate group containing dispersant selected from the group consisting of lignosulfonates, melamine formaldehyde sulfonate condensates, β-naphthalene sulfonic acid condensates, sulfonated ketone-formaldehyde-condensates, and copolymers comprising sulfa group containing units and/or sulfonate group-containing units and carboxylic acid and/or carboxylate group-containing units.

18. The construction chemical composition of claim 1, wherein the aluminate-containing cement is at least one selected from the group consisting of CEM cement and aluminate cement.

19. The construction chemical composition of claim 18, wherein the aluminate-containing cement is CEM cement.

20. The construction chemical composition of claim 18, wherein the aluminate-containing cement is a mixture of CEM cement and alumni, to cement or a mixture of CEM cement, high alumina cement and sulfoaluminate cement.

21. The construction chemical composition of claim 18, additionally comprising a calcium sulfate.

22. The construction chemical composition of claim 12, wherein the additive is at least one selected from the group consisting of inorganic carbonates, alkali metal sulfates, latent hydraulic binders, dispersants, hardening accelerators, fillers, essentially aluminate-free cement, and aggregates.

23. A method, comprising employing the construction chemical composition according to claim 1 as a retarder for aluminate-containing building material formulations and/or for producing building products.

* * * * *

UNITED STATES PATENT AND TRADEMARK OFFICE
CERTIFICATE OF CORRECTION

PATENT NO. : 10,815,152 B2  
APPLICATION NO. : 16/308119  
DATED : October 27, 2020  
INVENTOR(S) : Dengler et al.

Page 1 of 2

It is certified that error appears in the above-identified patent and that said Letters Patent is hereby corrected as shown below:

In the Specification

In Column 1, Line 11, delete "for example" and insert -- for example, -- at each occurrence throughout the Patent.

In Column 1, Line 12, delete "(SLU)," and insert -- (SLUs), --, therefor.

In Column 1, Line 17, delete "no" and insert -- n° --, therefor.

In Column 1, Line 57, delete "an hydroxycarboxylic" and insert -- a hydroxycarboxylic --, therefor.

In Column 3, Line 31, delete "CH(OH)." and insert -- CH(OH). --, therefor.

In Column 5, Line 1, delete "50" and insert -- ≥50 --, therefor.

In Column 5, Line 54, delete "heptaaluminate" and insert -- hepta-aluminate --, therefor.

In Column 6, Line 21, delete "heptaaluminate" and insert -- hepta-aluminate --, therefor.

In Column 6, Line 44, delete "calciumsulfate" and insert -- calcium sulfate --, therefor.

In Column 8, Line 22, delete "calciumsulfate" and insert -- calcium sulfate --, therefor.

In Column 14, Line 8, delete "-naphthaline-formaldehyde-condensates" and insert -- •-naphthalene-formaldehyde-condensates --, therefor.

In Column 14, Lines 30-31, delete "•-naphthaline-formaldehyde-condensates" and insert -- •-naphthalene-formaldehyde-condensates --, therefor.

In Column 15, Lines 50-51, delete "keton-formaldehyde-condensates," and insert

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,815,152 B2

-- ketone-formaldehyde-condensates, --, therefor.

In Column 15, Line 51, delete "(PCE)," and insert -- (PCEs), --, therefor.

In Column 17, Line 11, delete "calciumsulfate" and insert -- calcium sulfate --, therefor.

In Column 17, Line 28, delete "methylhydroxyethylcelluose" and insert
-- methylhydroxyethylcellulose --, therefor.

In Column 17, Line 29, delete "methylhydroxyethylcelluose" and insert
-- methylhydroxyethylcellulose --, therefor.

In Column 20, Line 54, delete "mo es" and insert -- moles --, therefor.

In Column 21, under "TABLE 3-continued", Line 20, delete "(Vicosity" and insert -- (Viscosity --, therefor.

In Column 21, under "TABLE 3-continued", Line 24, delete "(ethylene-vinylacetate" and insert
-- (ethylene-vinyl acetate --, therefor.

In Column 31, under "TABLE 15", Line 1, delete "moartar" and insert -- mortar --, therefor.

In Column 32, under "TABLE 16-continued", Line 30, delete "12..0" and insert -- 12.0 --, therefor.

In Column 35, Line 50, delete "N3.16)" and insert -- N3.16). --, therefor.

In Column 36, under "TABLE 21", Line 55, delete "Defaomer" and insert -- Befoamer --, therefor.

In Column 37, under "TABLE 21-continued", Line 18, delete "(*[1])Slump" and insert -- *1: Slump --, therefor.

In Column 37, under "TABLE 21-continued", Line 18, delete "Hagermann" and insert
-- Hägermann --, therefor.

In the Claims

In Column 37, Claim 1, Line 24, delete "comprising" and insert -- comprising: --, therefor.

In Column 37, Claim 1, Line 36, delete "-SO$_2$, X-SO$_3$X," and insert -- -SO$_2$X, -SO$_3$X, --, therefor.

In Column 38, Claim 7, Line 18, delete "wherein in" and insert -- wherein m --, therefor.

In Column 38, Claim 17, Line 53, delete "sulfa" and insert -- sulfo --, therefor.

In Column 38, Claim 20, Line 64, delete "alumni, to" and insert -- aluminate --, therefor.